(12) United States Patent
Hoshuyama et al.

(10) Patent No.: US 11,043,228 B2
(45) Date of Patent: Jun. 22, 2021

(54) MULTI-MICROPHONE SIGNAL PROCESSING APPARATUS, METHOD, AND PROGRAM FOR WIND NOISE SUPPRESSION

(71) Applicants: NEC Corporation, Tokyo (JP); NEC Platforms, Ltd., Kawasaki (JP)

(72) Inventors: Osamu Hoshuyama, Tokyo (JP); Ryoji Miyahara, Kanagawa (JP); Akihiko Sugiyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/571,914

(22) PCT Filed: Apr. 14, 2016

(86) PCT No.: PCT/JP2016/062021
§ 371 (c)(1),
(2) Date: Nov. 6, 2017

(87) PCT Pub. No.: WO2016/181752
PCT Pub. Date: Nov. 17, 2016

(65) Prior Publication Data
US 2018/0090153 A1 Mar. 29, 2018

(30) Foreign Application Priority Data
May 12, 2015 (JP) .............................. JP2015-097716

(51) Int. Cl.
*G10L 21/0232* (2013.01)
*G10L 21/0208* (2013.01)
(Continued)

(52) U.S. Cl.
CPC ...... *G10L 21/0232* (2013.01); *G10L 21/0208* (2013.01); *G10L 25/84* (2013.01);
(Continued)

(58) Field of Classification Search
CPC ....... G10L 21/0208; G10L 2021/02165; G10L 25/84; H04R 1/086; H04R 2410/07
(Continued)

(56) References Cited

U.S. PATENT DOCUMENTS 9,330,675 B2 * 5/2016 Zhang .................... H04R 1/245
9,549,250 B2 * 1/2017 Herbig ................... H04R 3/005
(Continued)

FOREIGN PATENT DOCUMENTS

EP 1732352 A1 * 12/2006 ............. H04R 3/005
JP H03-139097 A 6/1991
(Continued)

OTHER PUBLICATIONS

International Search Report for PCT Application No. PCT/JP2016/062021, dated Jun. 28, 2016.
(Continued)

*Primary Examiner* — Daniel C Washburn
*Assistant Examiner* — Oluwadamilola M Ogunbiyi
(74) *Attorney, Agent, or Firm* — Sughrue Mion, PLLC

(57) ABSTRACT

There is provided a signal processing apparatus that obtains a speech signal with sufficiently reduced wind noise. The signal processing apparatus includes a main microphone that is provided so as to be readily influenced by movement of air outside the signal processing apparatus, a sub microphone that is provided so as to be hardly influenced by movement of air outside the signal processing apparatus, a determiner that determines, based on a strength of a main speech signal output from the main microphone, whether the main speech signal includes a predetermined amount of wind noise, and a selector that receives the main speech signal and a sub speech signal output from the sub microphone, executes, if it is determined that the main speech signal includes the predetermined amount of wind noise, selection processing
(Continued)

for outputting the sub speech signal, and executes, if it is determined that the main speech signal includes no predetermined amount of wind noise, selection processing for outputting the main speech signal.

13 Claims, 32 Drawing Sheets

(51) Int. Cl.
  *G10L 25/84*  (2013.01)
  *G10L 21/0216*  (2013.01)
  *H04R 3/00*  (2006.01)
  *H04R 1/08*  (2006.01)
  *H04R 1/40*  (2006.01)
  *H04M 1/02*  (2006.01)
  *H04M 1/60*  (2006.01)
(52) U.S. Cl.
  CPC ............ *H04M 1/6008* (2013.01); *H04R 3/00* (2013.01); *H04R 3/005* (2013.01); *G10L 2021/02165* (2013.01); *H04M 1/026* (2013.01); *H04R 1/086* (2013.01); *H04R 1/406* (2013.01); *H04R 2201/401* (2013.01); *H04R 2201/405* (2013.01); *H04R 2410/07* (2013.01)
(58) Field of Classification Search
  USPC ................ 704/226, 227, 233; 381/94.2, 94.7
  See application file for complete search history.

(56) References Cited

U.S. PATENT DOCUMENTS

| | | | | |
|---|---|---|---|---|
| 2003/0147538 | A1* | 8/2003 | Elko | H04R 3/005 381/92 |
| 2004/0161120 | A1* | 8/2004 | Petersen | H04R 3/005 381/92 |
| 2004/0165736 | A1* | 8/2004 | Hetherington | G10L 21/0208 381/94.3 |
| 2006/0120540 | A1* | 6/2006 | Luo | H04R 25/407 381/98 |
| 2008/0226098 | A1* | 9/2008 | Haulick | H04R 3/005 381/94.9 |
| 2010/0022280 | A1* | 1/2010 | Schrage | H04M 1/58 455/567 |
| 2010/0022283 | A1* | 1/2010 | Terlizzi | H04M 1/05 455/570 |
| 2010/0054516 | A1* | 3/2010 | Chan | H04R 1/086 381/359 |
| 2010/0128901 | A1 | 5/2010 | Herman | |
| 2012/0123771 | A1* | 5/2012 | Chen | G10L 21/0208 704/226 |
| 2012/0140946 | A1* | 6/2012 | Yen | H04R 1/1083 381/92 |
| 2012/0148063 | A1* | 6/2012 | Kajimura | G10L 21/0208 381/73.1 |
| 2012/0148067 | A1* | 6/2012 | Petersen | H04R 3/005 381/92 |
| 2012/0250927 | A1* | 10/2012 | Ring | H04R 3/005 381/359 |
| 2012/0253798 | A1* | 10/2012 | Walters | G10L 21/0208 704/226 |
| 2012/0257779 | A1* | 10/2012 | Kimura | H04N 5/225 381/359 |
| 2013/0034256 | A1* | 2/2013 | Akino | H04R 9/08 381/356 |
| 2013/0243214 | A1* | 9/2013 | Penketh | G10K 11/175 381/71.6 |
| 2013/0259263 | A1* | 10/2013 | Konchitsky | G10K 11/002 381/94.1 |
| 2014/0219474 | A1* | 8/2014 | Feldt | H04R 3/04 381/98 |
| 2015/0078568 | A1* | 3/2015 | Kawakami | H04R 1/086 381/71.1 |
| 2015/0172811 | A1* | 6/2015 | Sassi | H04R 3/002 381/71.1 |
| 2015/0249892 | A1* | 9/2015 | Kuhnel | H04R 25/552 381/315 |
| 2015/0326748 | A1* | 11/2015 | Tisch | H04R 3/005 348/231.4 |
| 2016/0012828 | A1* | 1/2016 | Chatlani | G10L 21/0232 704/205 |
| 2016/0286295 | A1* | 9/2016 | Kar | H04R 1/086 |
| 2016/0302015 | A1* | 10/2016 | El Guindi | H04R 25/356 |
| 2016/0343385 | A1* | 11/2016 | Hetherington | G10L 21/0232 |
| 2017/0208407 | A1* | 7/2017 | Sapozhnykov | H04R 29/004 |
| 2018/0090153 | A1* | 3/2018 | Hoshuyama | H04R 3/00 |

FOREIGN PATENT DOCUMENTS

| | | |
|---|---|---|
| JP | H09-065482 A | 3/1997 |
| JP | 2007-158516 A | 6/2007 |
| JP | 2010-519801 A | 6/2010 |
| JP | 2016-032139 A | 3/2016 |

OTHER PUBLICATIONS

Japanese Office Action for JP Application No. 2017-517838 dated Nov. 28, 2019 with English Translation.

* cited by examiner

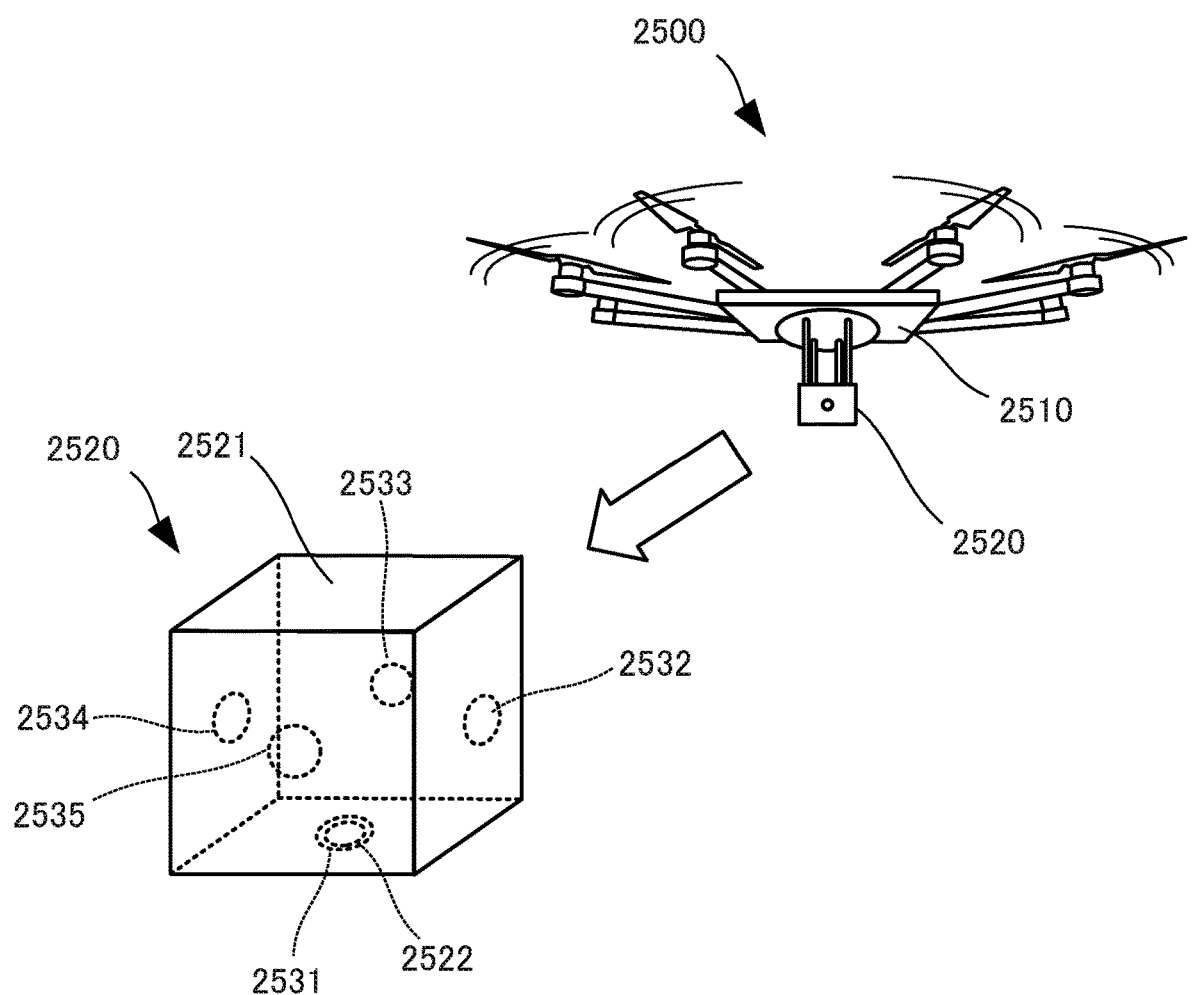
F I G. 25

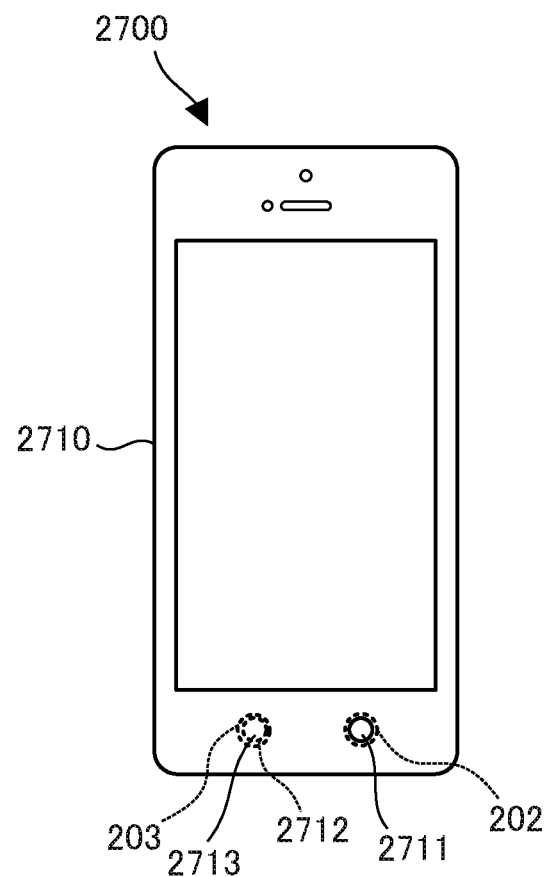
F I G. 27

MULTI-MICROPHONE SIGNAL PROCESSING APPARATUS, METHOD, AND PROGRAM FOR WIND NOISE SUPPRESSION

CROSS REFERENCE TO RELATED APPLICATIONS

This application is a National Stage Entry of PCT/JP2016/062021 filed on Apr. 14, 2016, which claims priority from Japanese Patent Application 2015-097716 filed on May 12, 2015, the contents of all of which are incorporated herein by reference, in their entirety.

TECHNICAL FIELD

The present invention relates to a signal processing apparatus, a signal processing method, and a signal processing program.

BACKGROUND ART

In the above technical field, patent literature 1 describes an apparatus formed by a bidirectional microphone having audio characteristics suitable for picking up wind noise and a nondirectional microphone suitable for picking up speech.

CITATION LIST

Patent Literature

Patent literature 1: Japanese Patent Laid-Open No. 2007-158516

SUMMARY OF THE INVENTION

Technical Problem

In the apparatus described in the above patent literature, however, the nondirectional microphone is readily influenced by wind noise, and it is thus impossible to obtain a speech signal with sufficiently reduced wind noise.

The present invention enables to provide a technique of solving the above-described problem.

Solution to Problem

One aspect of the present invention provides a signal processing apparatus comprising:
 a main microphone that is provided so as to be readily influenced by movement of air outside the signal processing apparatus;
 a sub microphone that is provided so as to be hardly influenced by movement of air outside the signal processing apparatus;
 a determiner that determines, based on a strength of a main speech signal output from the main microphone, whether the main speech signal includes a predetermined amount of wind noise; and
 a selector that receives the main speech signal and a sub speech signal output from the sub microphone, executes, if it is determined that the main speech signal includes the predetermined amount of wind noise, selection processing for outputting the sub speech signal, and executes, if it is determined that the main speech signal includes no predetermined amount of wind noise, selection processing for outputting the main speech signal.

Another aspect of the present invention provides a signal processing method of a signal processing apparatus including a main microphone that is provided so as to be readily influenced by movement of air outside the signal processing apparatus and a sub microphone that is provided so as to be hardly influenced by movement of air outside the signal processing apparatus, the method comprising:
 determining, based on a strength of a main speech signal output from the main microphone, whether the main speech signal includes a predetermined amount of wind noise; and
 receiving the main speech signal and a sub speech signal output from the sub microphone, executing, if it is determined that the main speech signal includes the predetermined amount of wind noise, selection processing for outputting the sub speech signal, and executing, if it is determined that the main speech signal includes no predetermined amount of wind noise, selection processing for outputting the main speech signal.

Still other aspect of the present invention provides a signal processing program of a signal processing apparatus including a main microphone that is provided so as to be readily influenced by movement of air outside the signal processing apparatus and a sub microphone that is provided so as to be hardly influenced by movement of air outside the signal processing apparatus, the program for causing a computer apparatus to execute a method, comprising:
 determining, based on a strength of a main speech signal output from the main microphone, whether the main speech signal includes a predetermined amount of wind noise; and
 receiving the main speech signal and a sub speech signal output from the sub microphone, executing, if it is determined that the main speech signal includes the predetermined amount of wind noise, selection processing for outputting the sub speech signal, and executing, if it is determined that the main speech signal includes no predetermined amount of wind noise, selection processing for outputting the main speech signal.

Advantageous Effects of Invention

According to this example embodiment, it is possible to obtain a speech signal with sufficiently reduced wind noise.

BRIEF DESCRIPTION OF DRAWINGS

FIG. 25 is a view showing the outer appearance of a multicopter including a signal processing apparatus according to the 21st example embodiment of the present invention;

FIG. 27 is a view showing the outer appearance of a smartphone according to the 22nd example embodiment of the present invention;

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise. Note that "speech signal" in the following explanation indicates a direct electrical change that occurs in accordance with speech or another sound. The speech signal transmits speech or another sound and is not limited to speech.

First Example Embodiment

Figure 1:
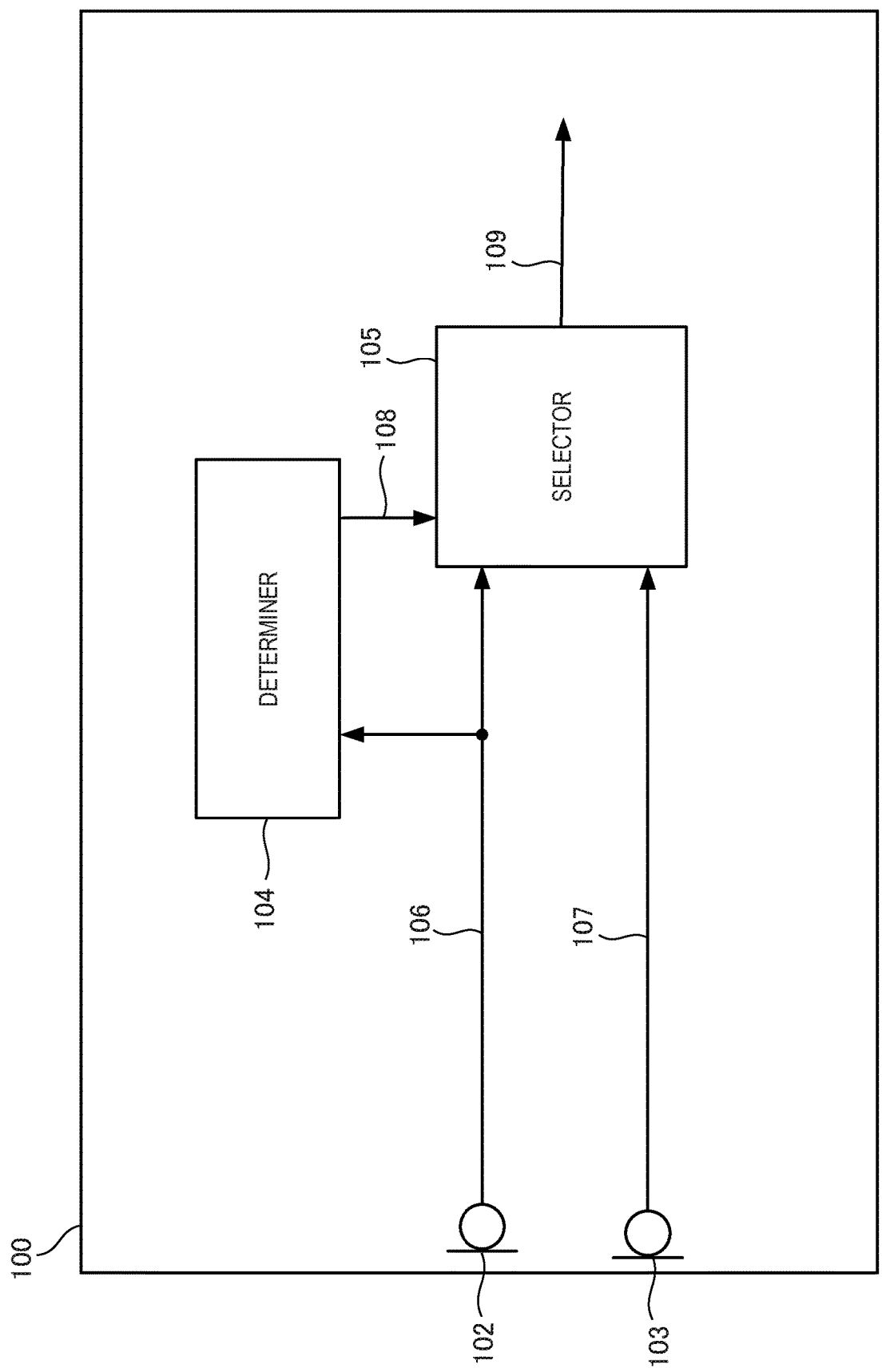
FIG. 1 is a block diagram showing the overall arrangement of a signal processing apparatus according to the first example embodiment of the present invention.

A signal processing apparatus 100 according to the first example embodiment of the present invention will be described with reference to the accompanying drawings. FIG. 1 is a block diagram showing the overall arrangement of the signal processing apparatus 100. As shown in FIG. 1, the signal processing apparatus 100 is an apparatus including a main microphone 102, a sub microphone 103, a determiner 104, and a selector 105.

The main microphone 102 is provided in the apparatus 100 so as to be readily influenced by movement of air outside the apparatus.

The sub microphone 103 is provided in the apparatus 100 so as to be hardly influenced by movement of air outside the apparatus.

Based on the strength of a main speech signal 106 output from the main microphone 102, the determiner 104 determines whether the main speech signal 106 includes wind noise.

The selector 105 receives the main speech signal 106 and a sub speech signal 107 output from the sub microphone 103. If it is determined that the main speech signal 106 includes a predetermined amount of wind noise, the selector 105 executes selection processing for outputting the sub speech signal 107; otherwise, the selector 105 executes selection processing for outputting the main speech signal 106.

With the above arrangement, a speech signal 109 output from the selector 105 is a speech signal including no wind noise.

Second Example Embodiment

A smartphone 200 as the second example embodiment of a signal processing apparatus according to the present invention will be described with reference to FIGS. 2 to 4.

Figure 2:
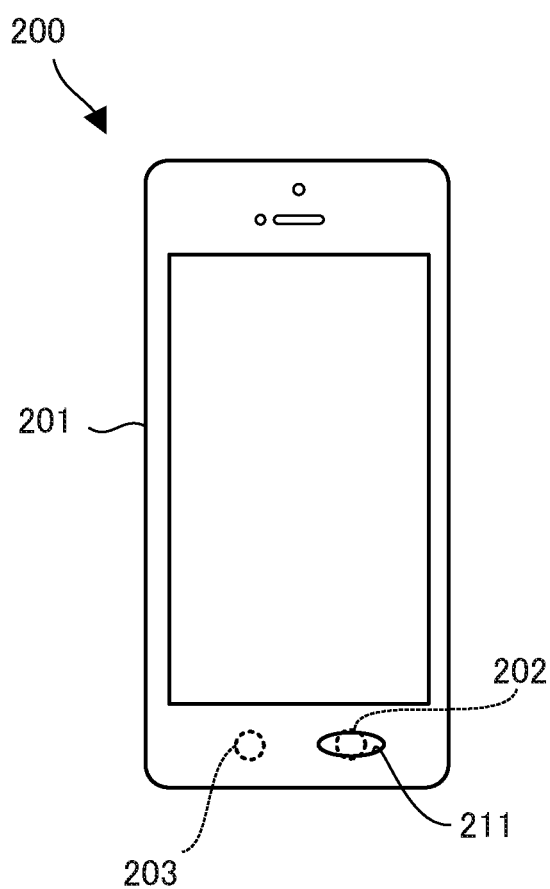
FIG. 2 is a view showing the outer appearance of a smartphone according to the second example embodiment of the present invention.

Referring to FIG. 2, the smartphone 200 includes a case 201. A main microphone 202 is arranged close to an opening 211 formed in the case 201 so as to be readily influenced by air outside the case 201.

A sub microphone 203 is arranged in the case 201 apart from the opening 211 formed in the case 201 so as to be hardly influenced by air outside the case 201. The sensitivity of the sub microphone when there is no wind is desirably set to be almost equal to that of the main microphone.

Figure 3:
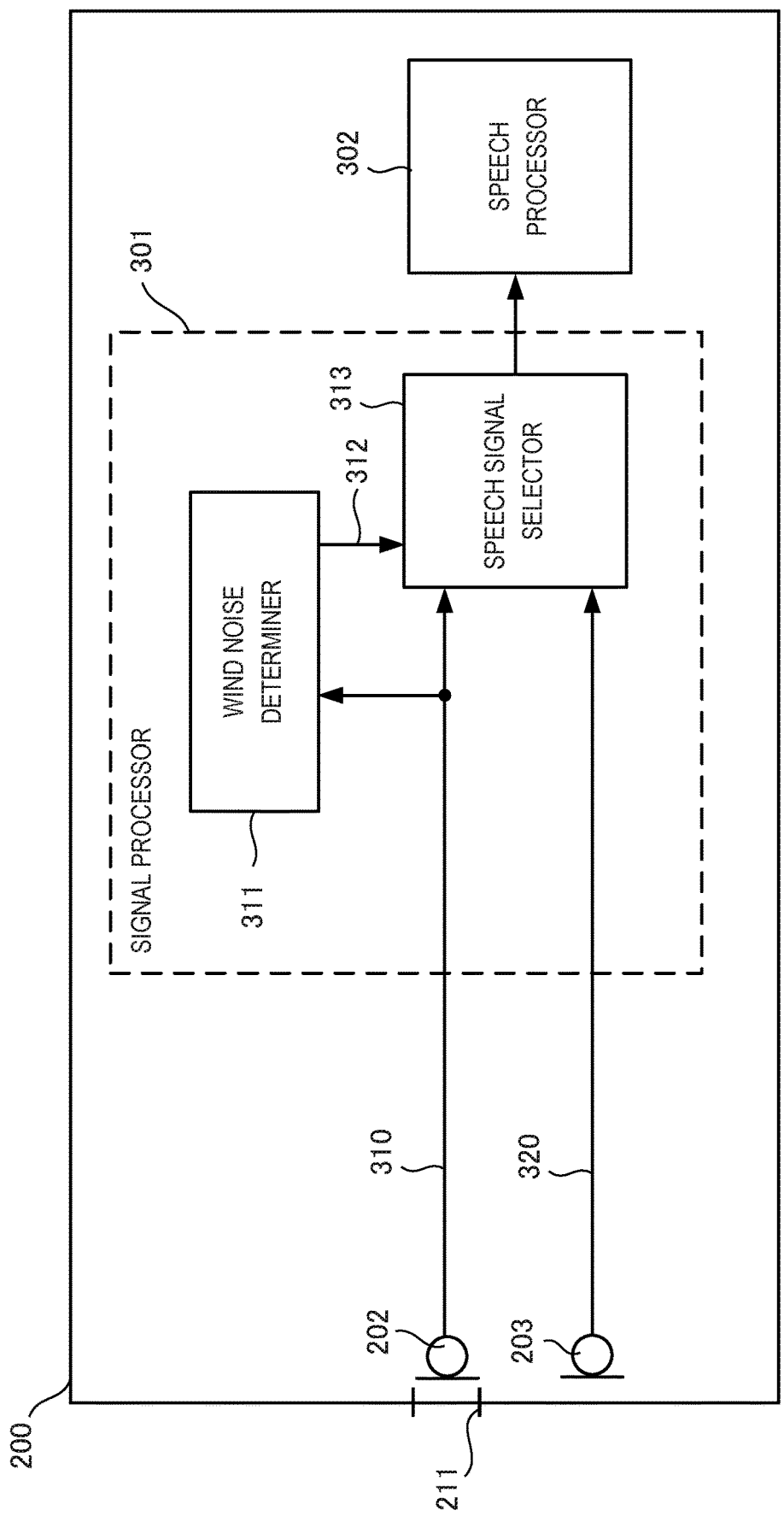
FIG. 3 is a block diagram showing the overall arrangement of a signal processing apparatus according to the second example embodiment of the present invention.

FIG. 3 is a block diagram showing a signal processing apparatus provided in the smartphone 200. As shown in FIG. 3, the smartphone 200 includes the main microphone 202, the sub microphone 203, a signal processor 301, and a speech processor 302. The main microphone 202 and the sub microphone 203 are microphones of the same type having the same characteristics.

The signal processor 301 includes a wind noise determiner 311 and a speech signal selector 313.

The wind noise determiner 311 compares the strength of a main speech signal 310 output from the main microphone 202 with a predetermined threshold, and outputs a binary signal 312 to the speech signal selector 313.

The speech signal selector 313 receives the main speech signal 310 output from the main microphone 202 and the sub speech signal 320 output from the sub microphone 203. Furthermore, if it is determined based on the binary signal 312 that the strength of the main speech signal 310 is smaller than the predetermined threshold, the speech signal selector 313 determines that the main speech signal 310 includes no predetermined amount of wind noise, and outputs the main speech signal 310. Alternatively, if the strength of the main speech signal 310 is equal to or larger than the threshold, the speech signal selector 313 determines that the main speech signal 310 includes the predetermined amount of wind noise, and outputs a sub speech signal 320.

The speech processor 302 receives a speech signal with suppressed wind noise, and performs processing (for example, recording processing, recognition processing, or the like).

<<Arrangements of Wind Noise Determiner and Speech Signal Selector>>

Figure 4:
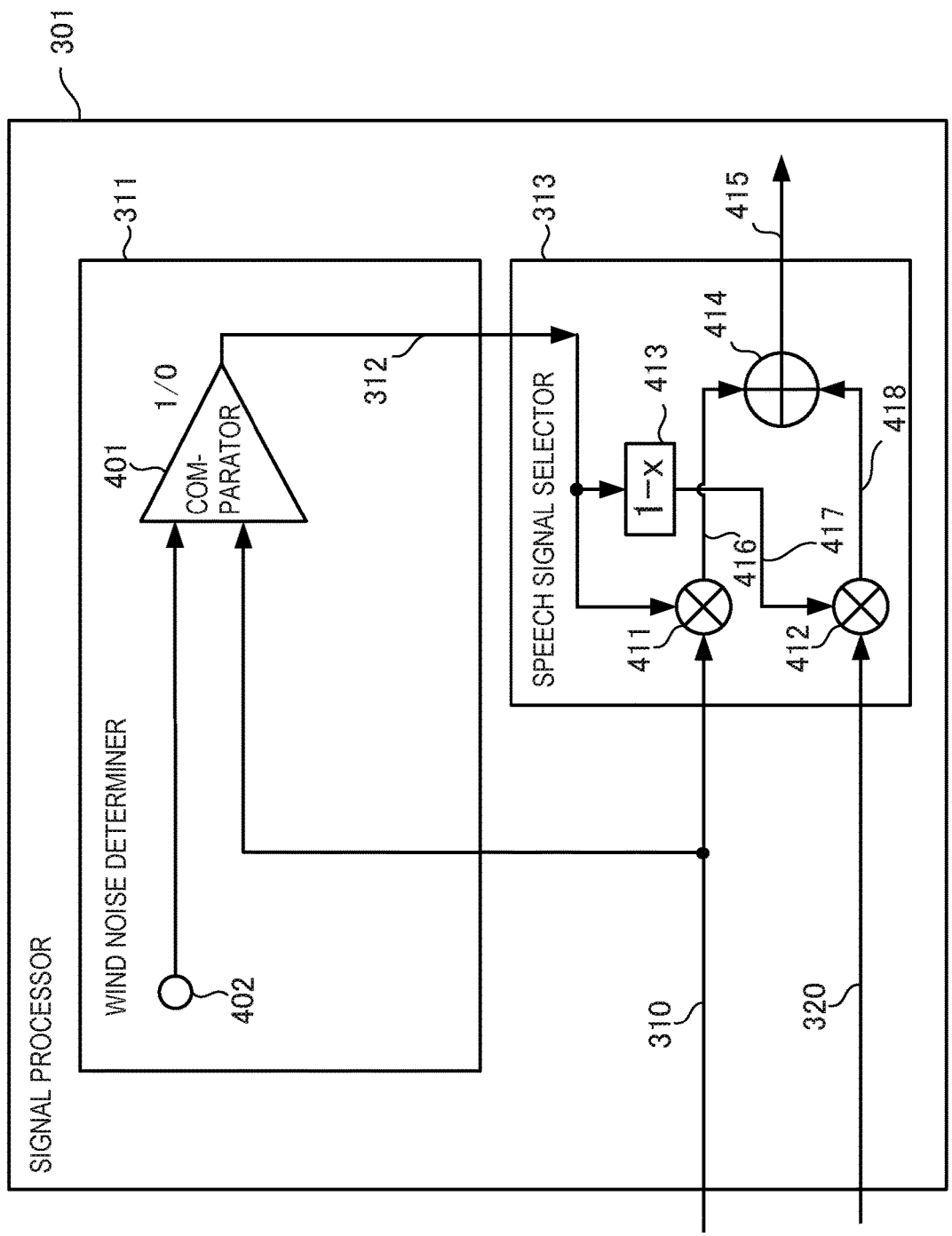
FIG. 4 is a block diagram showing the arrangements of a determiner and selector according to the second example embodiment of the present invention.

FIG. 4 is a block diagram showing examples of the arrangements of the wind noise determiner 311 and speech signal selector 313. As shown in FIG. 4, the wind noise determiner 311 includes a comparator 401, and causes the comparator 401 to determine whether the strength of the main speech signal 310 is equal to or larger than a threshold 402 and output the binary signal 312. As a result of the comparison, if the strength of the main speech signal 310 is equal to or larger than the threshold 402, the comparator 401 outputs 0 as the binary signal 312; otherwise, the comparator 401 outputs 1 as the binary signal 312. Note that the threshold 402 is set to a value which is larger by a predetermined amount than the maximum strength of the main speech signal 310 obtained when no predetermined amount of wind noise is input to the main microphone 202. By performing comparison in the comparator 401, when the predetermined amount of wind noise is input to the main microphone 202, the comparator 401 outputs 0 as the binary signal 312.

The speech signal selector 313 includes multipliers 411 and 412, a subtracter 413, and a combiner 414.

The multiplier 411 outputs a speech signal 416 obtained by multiplying the main speech signal 310 by the value of the binary signal 312 as a constant.

The multiplier 412 outputs a speech signal 418 obtained by multiplying the sub speech signal 320 by, as a constant, a value 417 output from the subtracter 413.

The subtracter 413 outputs the value 417 obtained by subtracting, from 1, the value output from the comparator 401.

The combiner 414 outputs a speech signal 415 obtained by combining the speech signal 416 output from the multiplier 411 with the speech signal 418 output from the multiplier 412.

With the above arrangement, if no wind blows against the main microphone 202, the main speech signal 310 is output as the output signal 415 of the combiner 414. If the predetermined amount of wind noise is mixed in the main speech signal 310 of the main microphone 202, the sub speech signal 320 output from the sub microphone 203 against which no wind blows is output as the output signal of the combiner 414. At this time, the sub speech signal 320 includes no predetermined amount of wind noise.

Therefore, the speech signal 415 output from the combiner 414 is a speech signal with sufficiently reduced wind noise.

As described above, when the speech processor 302 performs speech processing, it is possible to obtain a speech signal in which no predetermined amount of wind noise is mixed. That is, if a wind blows against the opening 211 and wind noise is mixed in the main speech signal 310, the sub speech signal of the sub microphone 203 in which no wind noise is mixed is used. Thus, even if there is a wind, it is possible to always obtain a speech signal in which no predetermined amount of wind noise is mixed.

Third Example Embodiment

Figure 5:
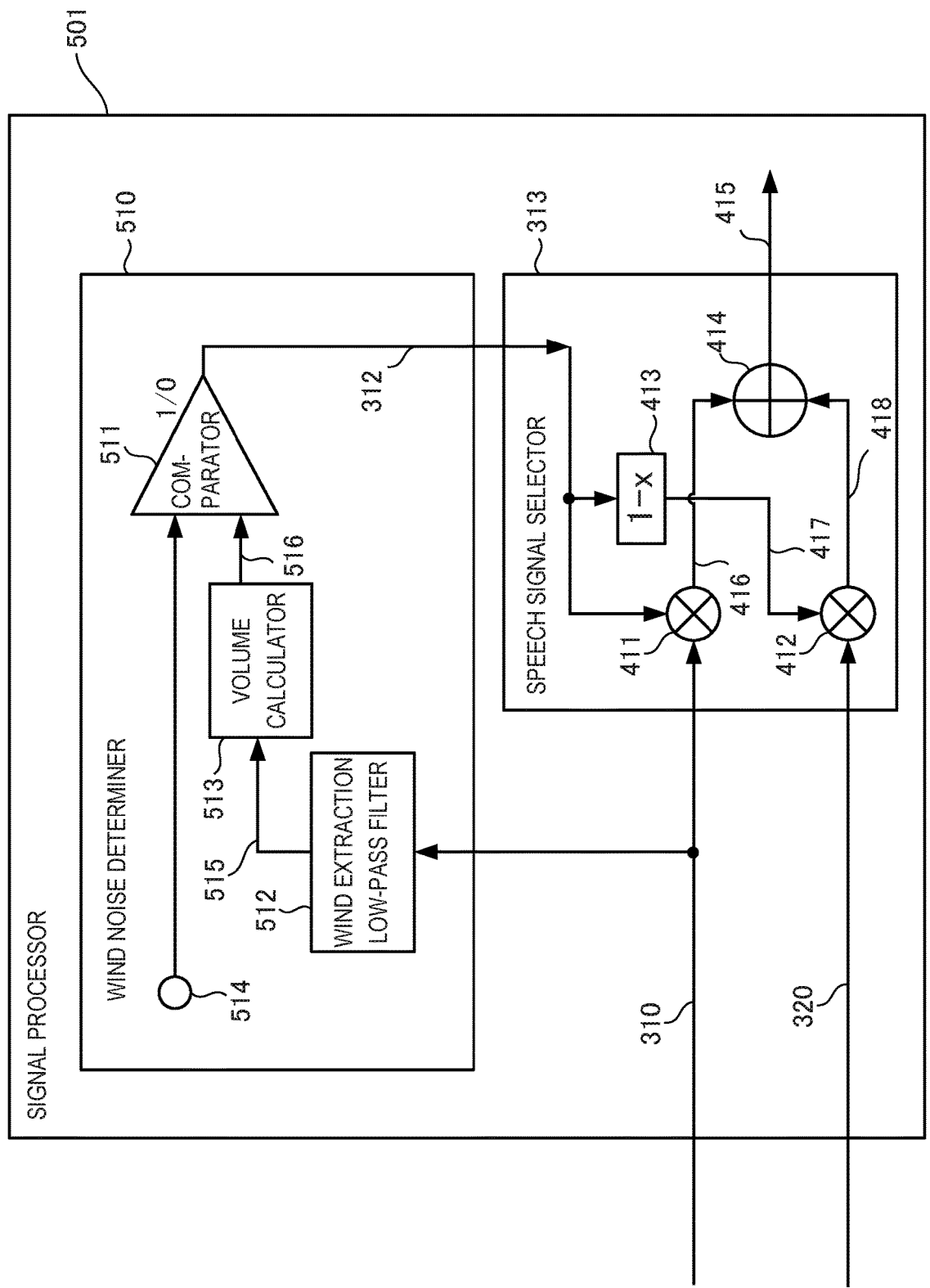
FIG. 5 is a block diagram showing the arrangement of a signal processing apparatus according to the third example embodiment of the present invention.

A signal processing apparatus according to the third example embodiment of the present invention will be described next with reference to FIG. 5. FIG. 5 is a block diagram showing the arrangement of a signal processor 501 of the signal processing apparatus according to this example embodiment. The signal processor 501 according to this example embodiment is different from the signal processor according to the above-described second example embodiment in that a wind noise determiner 510 is provided instead of the wind noise determiner 311. The remaining components and operations are the same as those in the second example embodiment. Hence, the same reference numerals denote the same components and operations, and a detailed description thereof will be omitted.

The wind noise determiner 510 includes a comparator 511, a wind extraction low-pass filter 512, and a volume calculator 513.

The wind extraction low-pass filter 512 is a low-pass filter, and receives a main speech signal 310, and extracts and outputs an electrical signal 515 in a frequency domain corresponding to the frequency of wind noise. That is, the wind extraction low-pass filter 512 passes the low frequency domain of the main speech signal. The volume calculator 513 calculates, based on the electrical signal 515 output from the wind extraction low-pass filter 512, a volume input to a main microphone 202, and outputs an electrical signal 516 corresponding to the volume.

The comparator 511 determines whether the strength of the signal 516 output from the volume calculator 513 is equal to or larger than a threshold 514, and outputs a binary signal 312. As a result of the comparison, if the strength of the signal 516 is equal to or larger than the threshold 514, the comparator 511 outputs 0 as the binary signal 312; otherwise, the comparator 511 outputs 1 as the binary signal 312. Note that the threshold 514 is set to a value larger by the predetermined amount than the maximum strength of the signal 516 obtained when no predetermined amount of wind noise is input to the main microphone 202. By performing comparison in the comparator 511, when the predetermined amount of wind noise is input to the main microphone 202, the comparator 511 outputs 0 as the binary signal.

Consequently, if no wind blows against the main microphone 202, a speech signal selector 313 outputs the main speech signal 310 as an output signal 415 of a combiner 414. Alternatively, if the predetermined amount of wind noise is mixed in the main speech signal 310 of the main microphone 202, the sub speech signal 320 output from the sub microphone 203 against which no wind blows is output as the output signal of the combiner 414. At this time, the sub speech signal 320 includes no predetermined amount of wind noise. Therefore, the speech signal 415 output from the combiner 414 is a speech signal with sufficiently reduced wind noise.

Fourth Example Embodiment

Figure 6A:
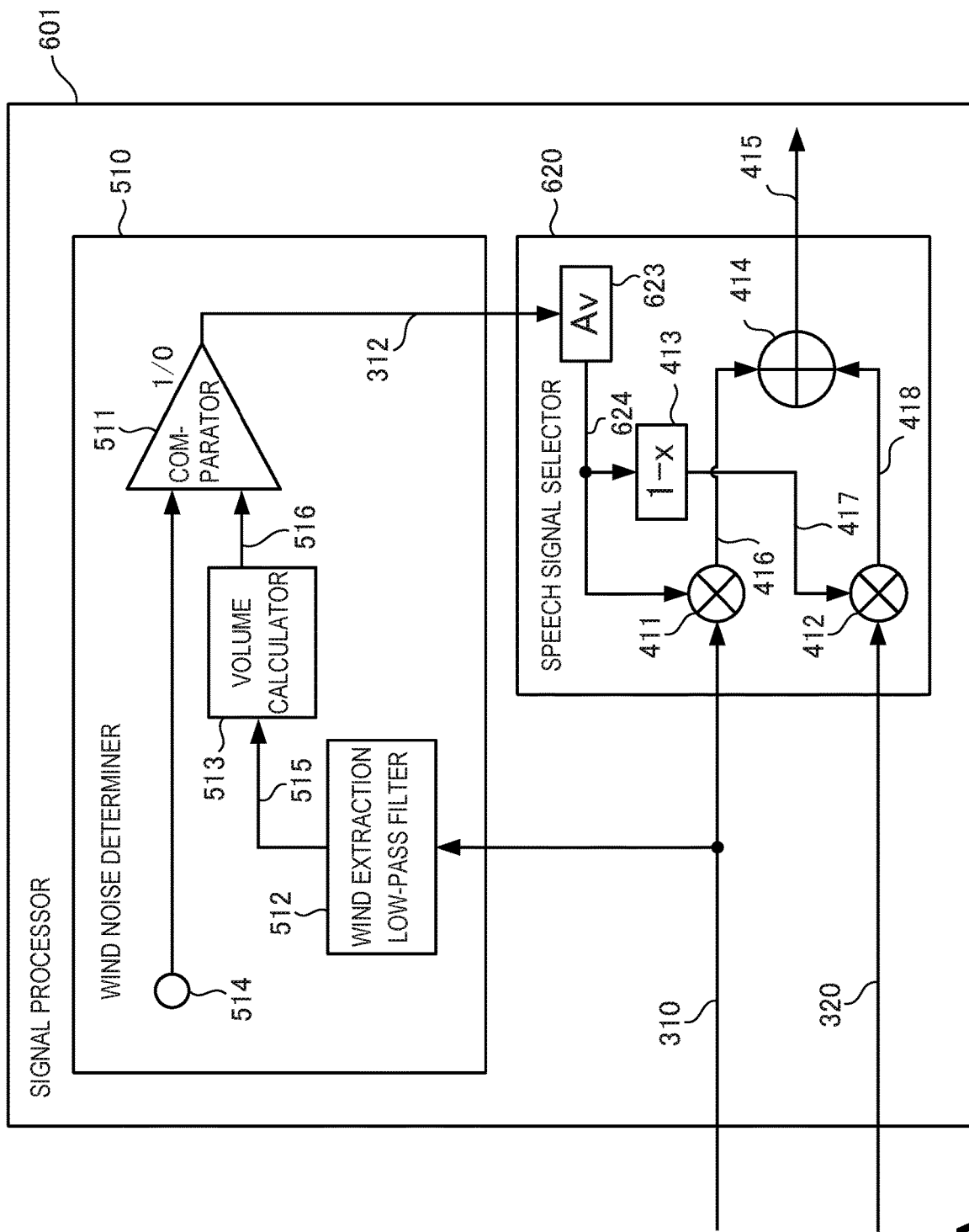
FIG. 6A is a block diagram showing the arrangement of a signal processing apparatus according to the fourth example embodiment of the present invention.
Figure 6B:
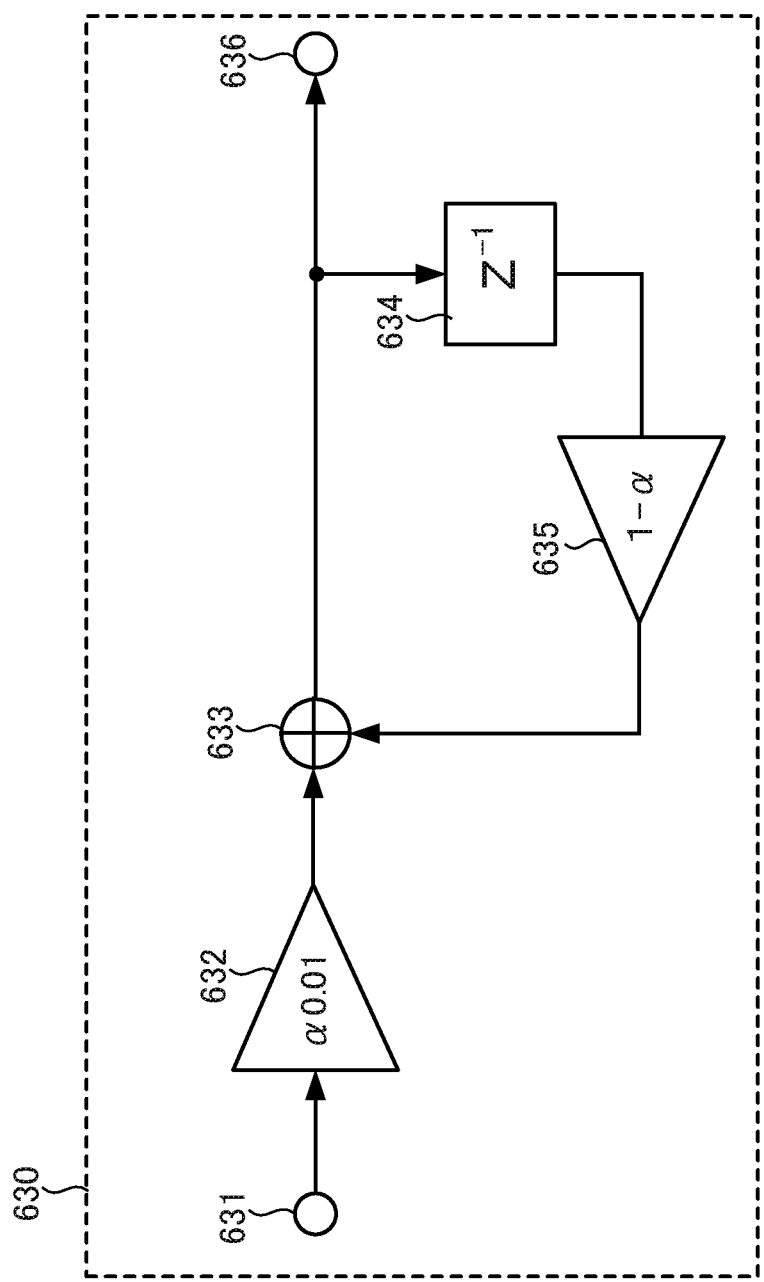
FIG. 6B is a view showing an example of a smoother in the signal processing apparatus according to the fourth example embodiment of the present invention.
Figure 6C:
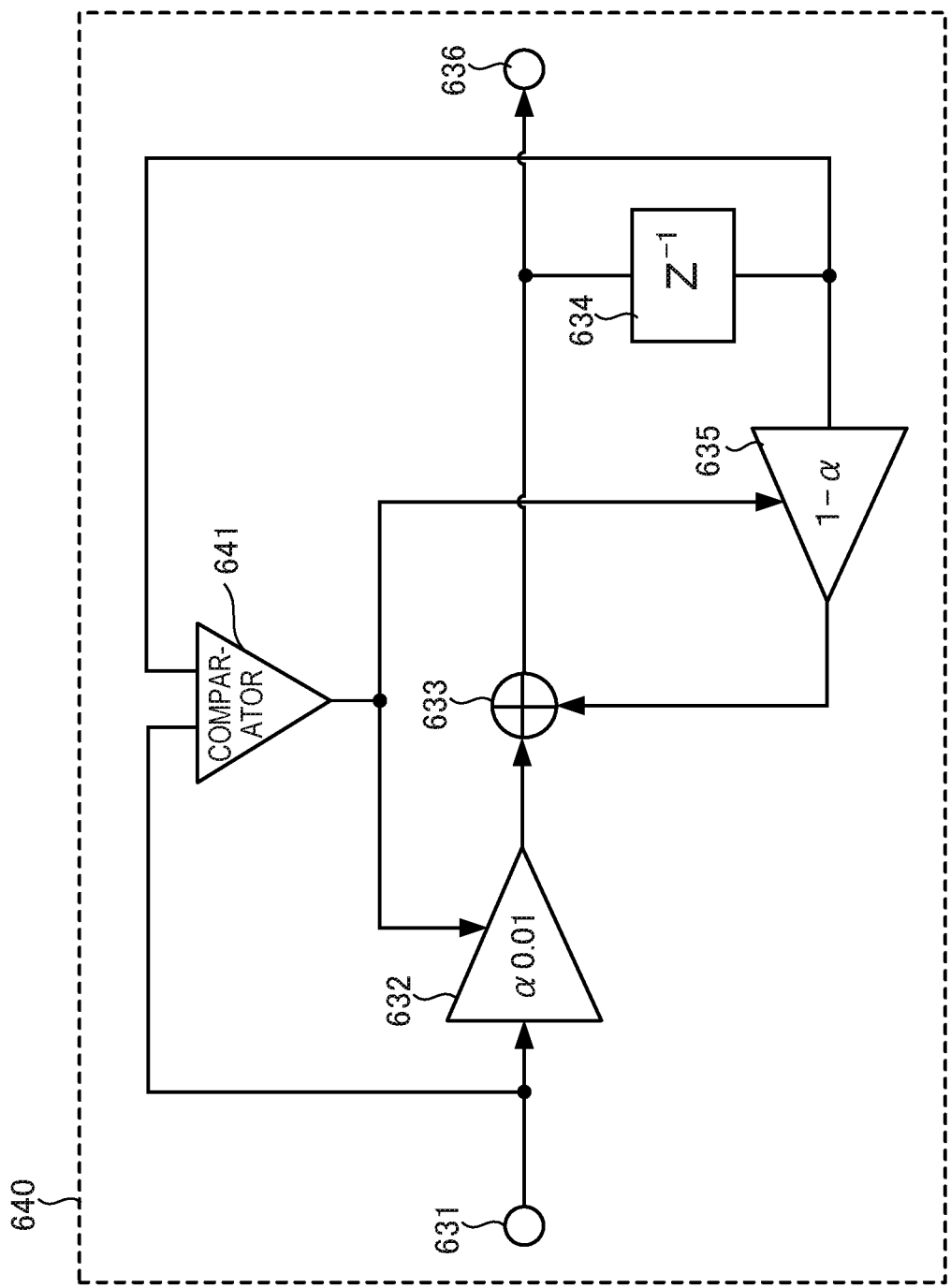
FIG. 6C is a view showing another example of the smoother in the signal processing apparatus according to the fourth example embodiment of the present invention.

A signal processing apparatus according to the fourth example embodiment of the present invention will be described next with reference to FIGS. 6A to 6C. FIG. 6A is a block diagram showing the arrangement of a signal processor 601 of the signal processing apparatus according to this example embodiment. The signal processing apparatus according to this example embodiment is different from that according to the third example embodiment in that a speech signal selector 620 is provided instead of the speech signal selector 313. The remaining components and operations are the same as those in the third example embodiment. Hence, the same reference numerals denote the same components and operations, and a detailed description thereof will be omitted.

The difference between the speech signal selectors 313 and 620 is that the speech signal selector 620 includes a smoother (Av) 623 in addition to the components of the speech signal selector 313.

The smoother 623 supplies, to a multiplier 411 and a subtracter 413, a signal 624 obtained by smoothing a binary signal 312 output from a comparator 511.

By smoothing by the smoother 623, the binary signal 312 that is instantaneously switched to 0 or 1 is transformed into the signal 624 that gradually changes for a predetermined time.

The multiplier 411 outputs a speech signal 416 obtained by multiplying a main speech signal 310 by the amplitude value of the electrical signal 624 as a constant.

A multiplier 412 outputs a speech signal 418 obtained by multiplying a sub speech signal 320 by, as a constant, a value 417 output from the subtracter 413.

The subtracter 413 outputs the value 17 obtained by subtracting, from 1, the amplitude value of the signal 624 output from the smoother 623.

A combiner 414 outputs a speech signal 415 obtained by combining the speech signal 416 output from the multiplier 411 with the speech signal 418 output from the multiplier 412.

The circuit of a smoother 630 as an example of the smoother 623 will be described next with reference to FIG. 6B.

The smoother 630 is a leakage integrator, and includes a multiplier 632, an adder 633, a delay unit 634, and a multiplier 635. The multiplier 632 multiplies, by a leakage coefficient α, a signal input from an input terminal 631, and outputs the thus obtained signal. In this example, the leakage coefficient a is set to 0.01.

The adder 633 outputs a signal obtained by adding the output signal of the multiplier 635 to the output signal of the multiplier 632.

The delay unit 634 receives a signal output from the adder 633, delays the signal by a predetermined time, and then outputs the signal.

The multiplier 635 receives the output signal of the delay unit 634, multiplies the signal by (1-α) as a leakage coefficient, and outputs the thus obtained signal.

With the above arrangement, a signal output from an output terminal 636, that is, the output signal of the adder 633 is a signal obtained by gradually changing the signal input to the input terminal 631 for a predetermined time.

The circuit of a smoother 640 as another example of the smoother 623 will be described with reference to FIG. 6C. Note that the smoother 640 shown in FIG. 6C is different from the smoother 630 shown in FIG. 6B in that a comparator 641 is additionally provided. The remaining same components are denoted by the same reference numerals, and a detailed description of the operations thereof will be omitted.

The comparator 641 compares the strength of an input signal to an input terminal 631 with that of an output signal from a delay unit 634, and outputs a comparison result to multipliers 632 and 635 as a binary signal.

If the strength of the input signal to the input terminal 631 is equal to or larger than that of the output signal from the delay unit 634, the comparator 641 outputs 0 as the binary signal; otherwise, the comparator 641 outputs 1 as the binary signal.

Each of the multipliers 632 and 635 operates when the binary signal input from the comparator 641 is 1, and stops its operation and is reset when the binary signal is 0. Unlike the multiplier 632 shown in FIG. 6B, the number of inputs of the multiplier 632 shown in FIG. 6C increases, and thus the operation of the multiplier 632 is different.

With the above arrangement, if no predetermined amount of wind blows against a main microphone 202, that is, if no predetermined amount of wind noise is mixed in the main speech signal 310, the main speech signal 310 is output as the output signal 415 of the combiner 414. Alternatively, if the predetermined amount of wind noise is mixed in the main speech signal 310, the ratio of the main speech signal 310 in the speech signal 415 of the combiner 414 gradually decreases, and the ratio of the sub speech signal 320 gradually increases. Then, after a predetermined time, the sub speech signal 320 output from a sub microphone 203 against which no predetermined amount of wind blows is output as the output signal of the combiner 414. At this time, the sub speech signal 320 includes no predetermined amount of wind noise. If the amount of wind noise mixed in the main speech signal 310 becomes smaller than the predetermined amount, the ratio of the main speech signal 310 in the output signal 415 of the combiner 414 gradually increases, and the ratio of the sub speech signal 320 gradually decreases. Thus, after the predetermined time, the main speech signal 310 output from the main microphone 202 is output as the output signal of the combiner 414. At this time, the main speech signal 310 is a signal with sufficiently reduced wind noise.

Note that the time from when the predetermined amount of wind noise is mixed in the main speech signal 310 until the components of the speech signal 415 output from the combiner 414 are completely switched from the main speech signal 310 to the sub speech signal 320 is determined based on the time constant of the smoother 623.

Consequently, the speech signal 415 output from the combiner 414 is a signal with sufficiently reduced wind noise.

Fifth Example Embodiment

Figure 7:
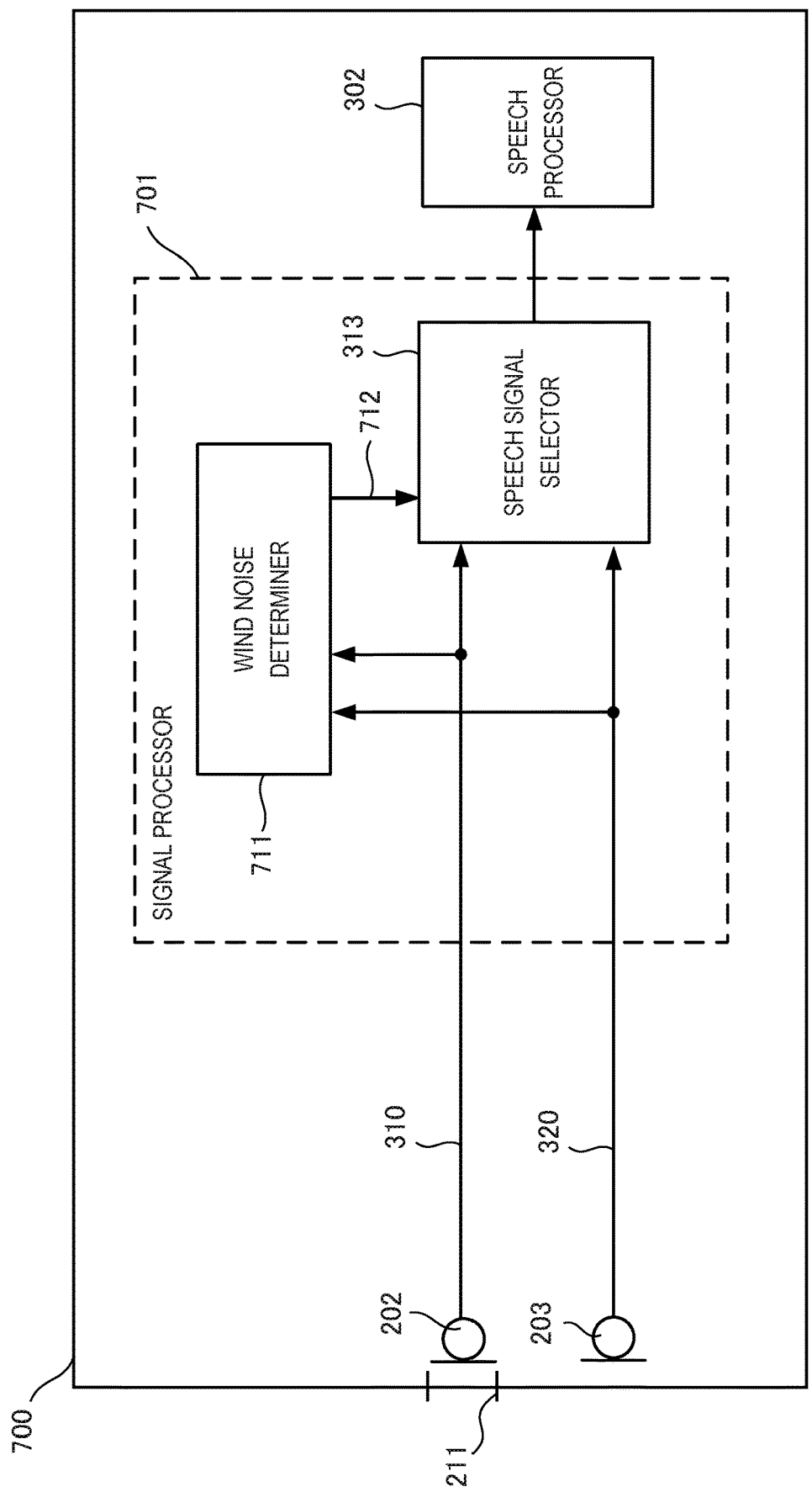
FIG. 7 is a block diagram showing the arrangement of a signal processing apparatus according to the fifth example embodiment of the present invention.

A signal processing apparatus according to the fifth example embodiment of the present invention will be described next with reference to FIG. 7. FIG. 7 is a block diagram showing the overall arrangement of a signal processing apparatus 700. As shown in FIG. 7, the signal processing apparatus 700 includes a main microphone 202, a sub microphone 203, a signal processor 710, and a speech processor 302. The signal processing apparatus 700 according to this example embodiment is different from that according to the above-described third example embodiment in that the signal processor 701 is provided instead of the signal processor 501. The remaining components and operations are the same as those in the third example embodiment. Hence, the same reference numerals denote the same components and operations, and a detailed description thereof will be omitted.

The signal processor 701 includes a wind noise determiner 711 and a speech signal selector 313.

The wind noise determiner 711 compares the strength of a main speech signal 310 output from the main microphone 202 with that of a sub speech signal 320 output from the sub microphone 203. The wind noise determiner 711 then outputs a binary signal 712 indicating whether the main speech signal 310 includes a predetermined amount of wind noise. The speech signal selector 313 receives this binary signal 712.

<<Arrangement of Wind Noise Determiner>>

Figure 8:
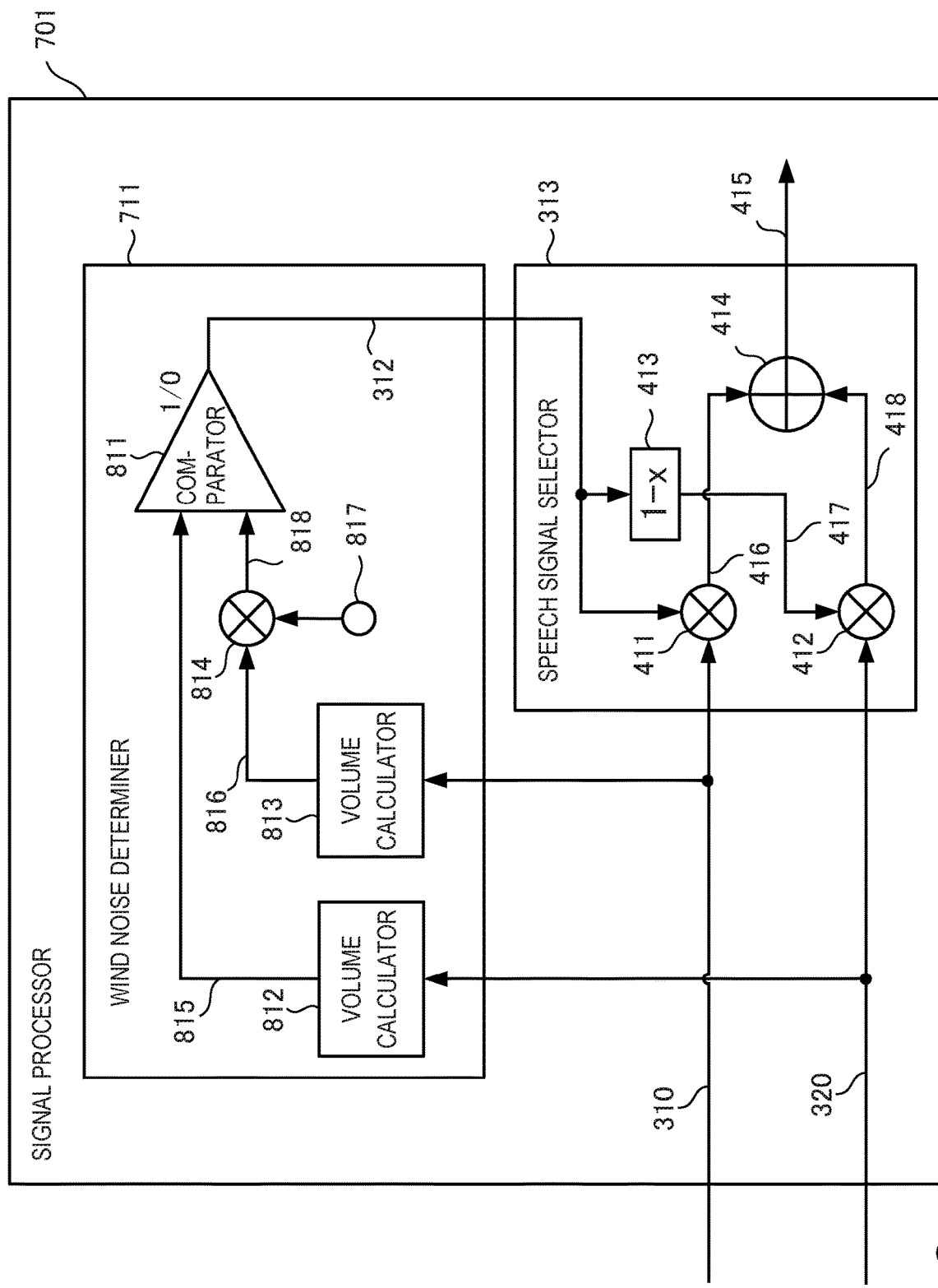
FIG. 8 is a block diagram showing the arrangements of a wind noise determiner and speech signal selector according to the fifth example embodiment of the present invention.

FIG. 8 is a block diagram showing examples of the arrangements of the wind noise determiner 711 and speech signal selector 313. As shown in FIG. 8, the wind noise determiner 711 includes a comparator 811, volume calculators 812 and 813, and a multiplier 814.

The volume calculator 812 calculates, based on the sub speech signal 320, a volume input to the sub microphone 203, and outputs an electrical signal 815 corresponding to this volume.

The volume calculator 813 calculates, based on the main speech signal 310, a volume input to the main microphone 202, and outputs an electrical signal 816 corresponding to this volume.

The multiplier 814 outputs a signal 818 obtained by multiplying the electrical signal 816 output from the volume calculator 813 by a predetermined constant 817.

The comparator 811 receives the signal 815 output from the volume calculator 812 and the signal 818 output from the multiplier 814, compares these signals, determines whether the strength of the signal 818 is equal to or larger than that of the signal 815, and then outputs a binary signal 312. As a result of the comparison, if the strength of the signal 818 is equal to or larger than that of the signal 815, the comparator 811 outputs 0 as the binary signal 312; otherwise, the comparator 811 outputs 1 as the binary signal 312. Note that the constant 817 set in the multiplier 814 is set to a value that makes the maximum strength of the signal 818, obtained when no predetermined amount of wind noise is input to the main microphone 202, smaller by a predetermined amount than the strength of the signal 815. Thus, by performing comparison in the comparator 811, when the predetermined amount of wind noise is input to the main microphone 202, the comparator 811 outputs 0 as the binary signal 312.

According to this example embodiment as well, it is possible to obtain the same effect as in the first to fourth example embodiments. A speech signal 415 output from a combiner 414 is a speech signal with sufficiently reduced wind noise.

Sixth Example Embodiment

Figure 9:
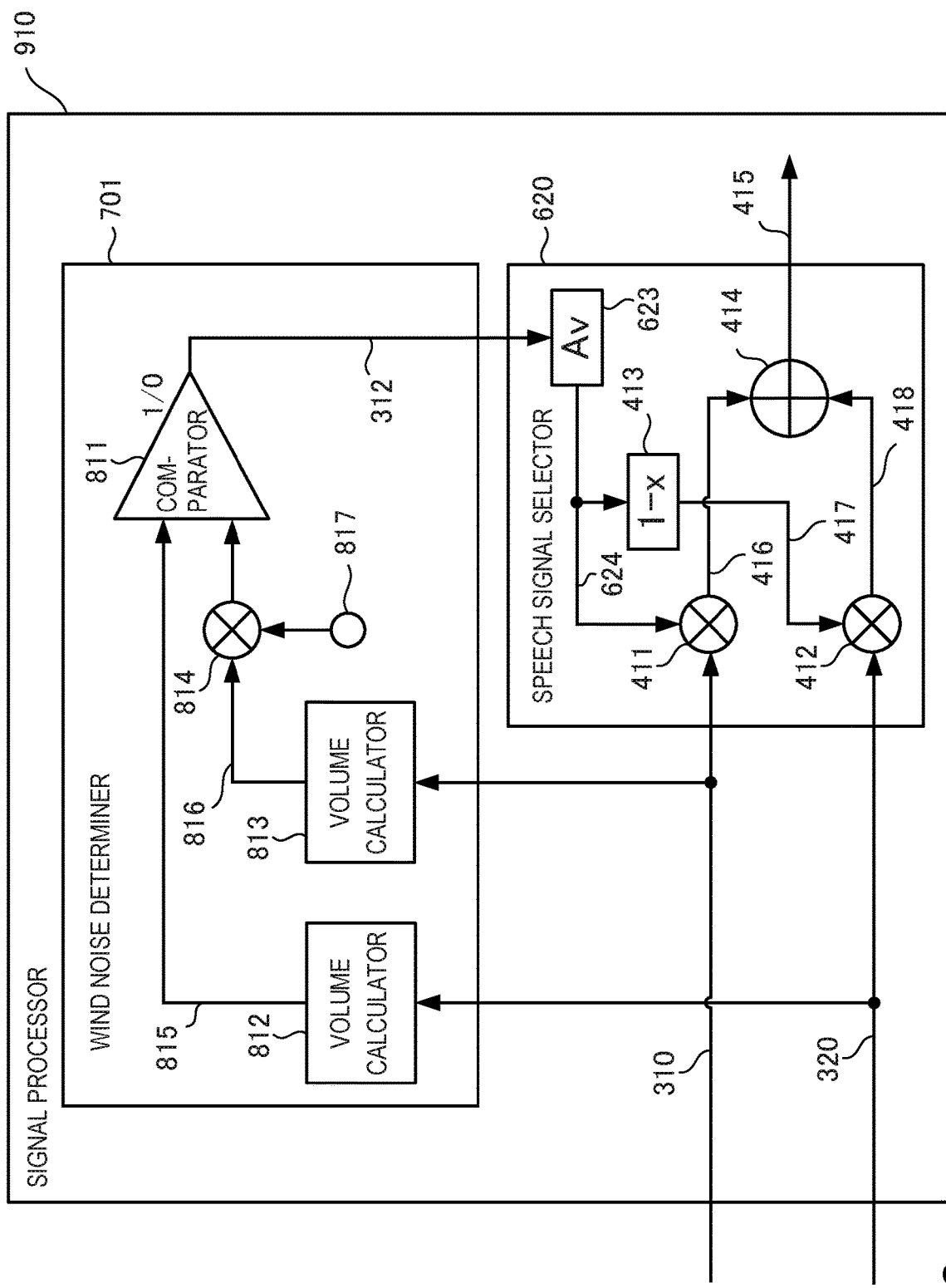
FIG. 9 is a block diagram showing the arrangement of a signal processing apparatus according to the sixth example embodiment of the present invention.

The signal processor of a signal processing apparatus according to the sixth example embodiment of the present invention will be described next with reference to FIG. 9. FIG. 9 is a block diagram showing the arrangement of a signal processor 910 of the signal processing apparatus according to this example embodiment. The signal processor according to this example embodiment is different from that according to the above-described fifth example embodiment in that a speech signal selector 620 described in the fourth example embodiment is provided instead of the speech signal selector 313. The remaining components and operations are the same as those in the fifth example embodiment. Hence, the same reference numerals denote the same components and operations, and a detailed description thereof will be omitted.

According to this example embodiment as well, it is possible to obtain the same effect as in the above-described fourth example embodiment. A speech signal 415 output from a combiner 414 is a signal with sufficiently reduced wind noise.

Seventh Example Embodiment

Figure 10:
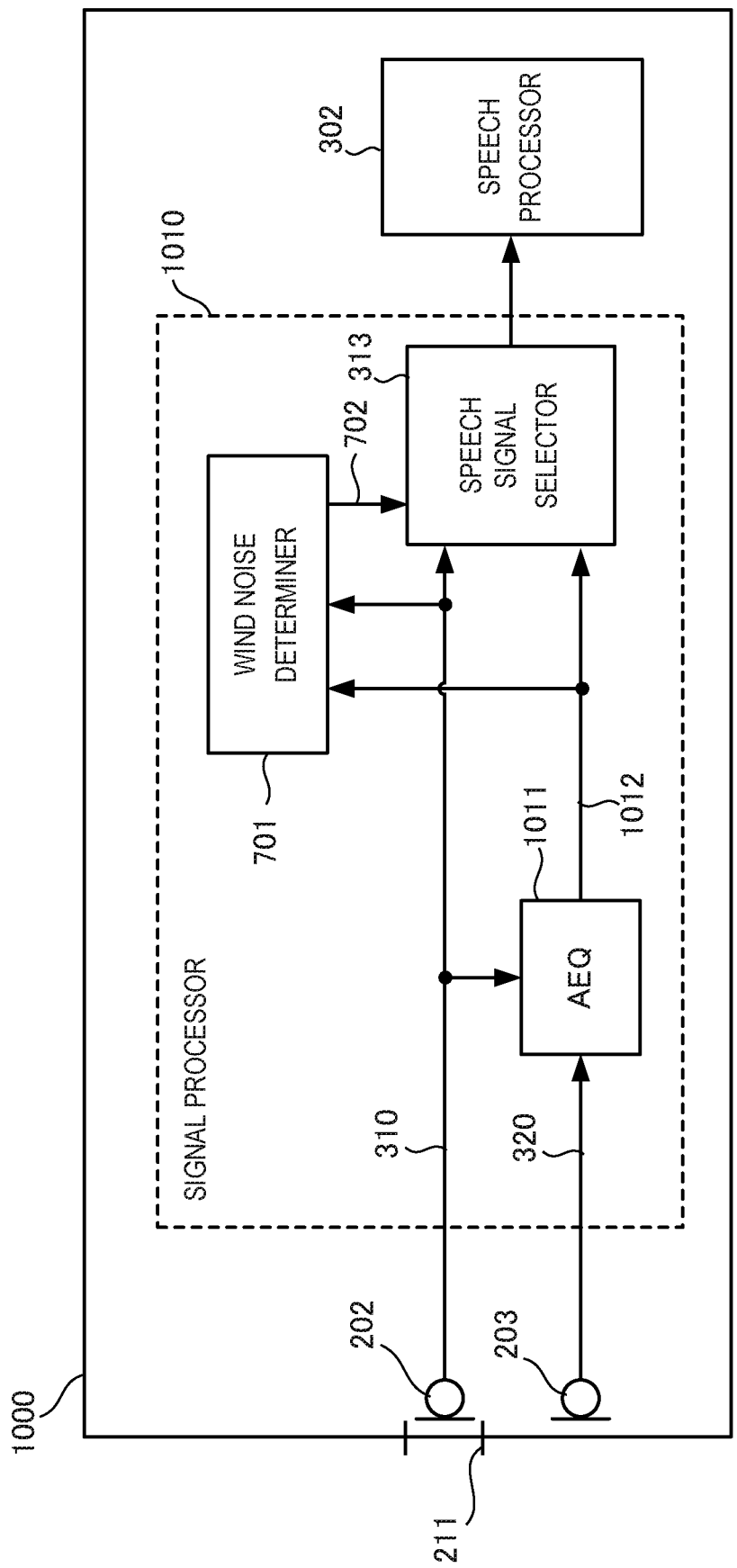
FIG. 10 is a block diagram showing the arrangement of a signal processing apparatus according to the seventh example embodiment of the present invention.

A signal processing apparatus according to the seventh example embodiment of the present invention will be described next with reference to FIG. 10. FIG. 10 is a block diagram showing the arrangement of a signal processing apparatus 1000 according to this example embodiment.

The signal processing apparatus 1000 according to this example embodiment is different from that according to the above-described fifth example embodiment in that a signal processor 1010 including an automatic equalizer (AEQ) 1011 is provided. The remaining components and operations are the same as those in the fifth example embodiment. Hence, the same reference numerals denote the same components and operations, and a detailed description thereof will be omitted.

In the signal processing apparatus 1000 according to this example embodiment, a main speech signal 310 is input to the automatic equalizer 1011, a wind noise determiner 711, and a speech signal selector 313. A sub speech signal 320 is input to the automatic equalizer 1011.

The automatic equalizer 1011 outputs a speech signal 1012 obtained by correcting the frequency characteristic of the sub speech signal 320 based on the main speech signal 310. At this time, the automatic equalizer 1011 corrects the sub speech signal 320 so that the difference between the frequency characteristic of the main speech signal 310 and that of the sub speech signal 320 falls within a predetermined range.

The automatic equalizer 1011 corrects the sub speech signal 320 in this way. Thus, when wind noise is generated, the speech signal 1012 obtained by improving the quality of the sub speech signal 320 can be used instead of the main speech signal 310.

<<Arrangement of Automatic Equalizer>>

Figure 11:
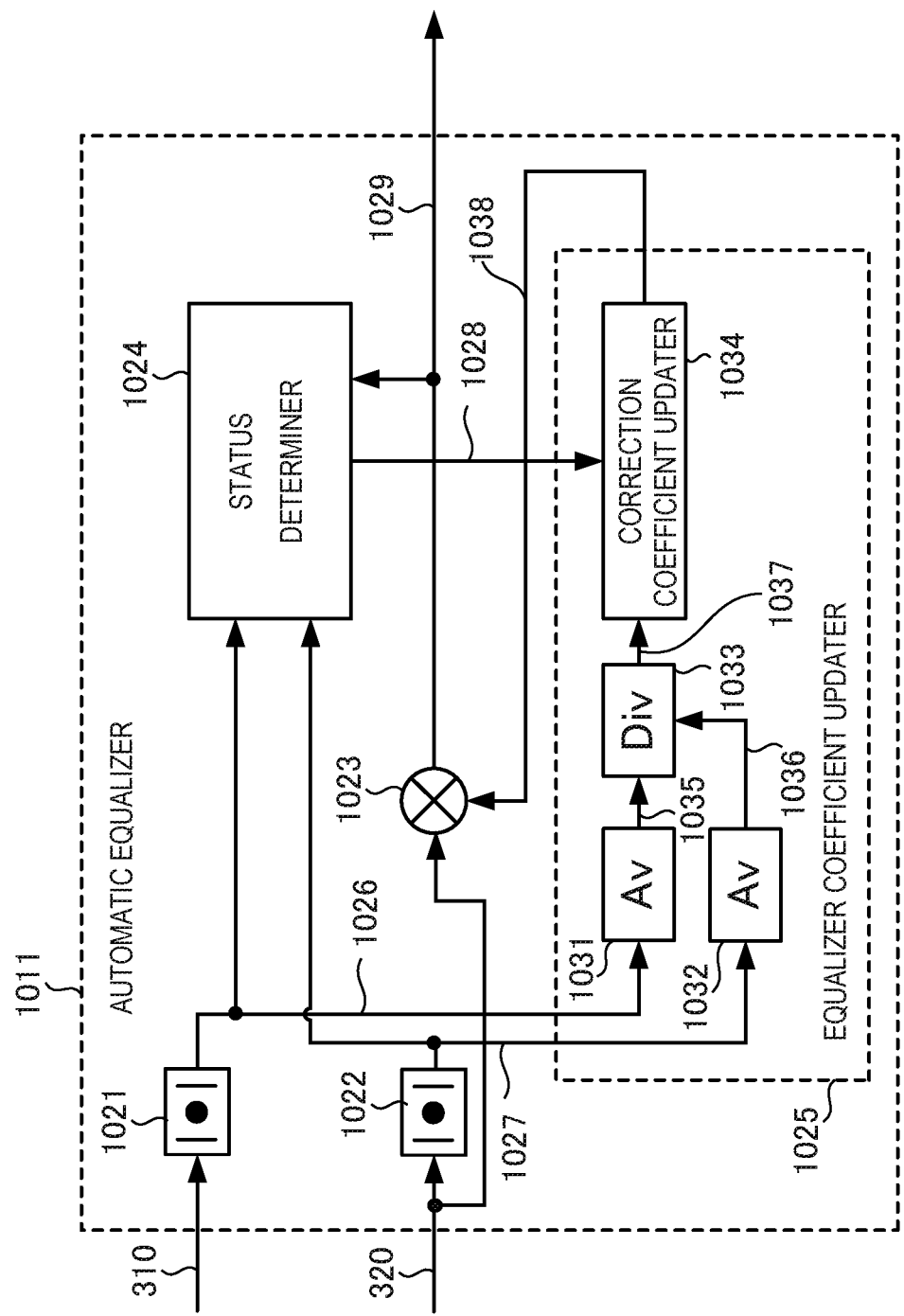
FIG. 11 is a block diagram showing the arrangement of an automatic equalizer according to the seventh example embodiment of the present invention.

FIG. 11 is a block diagram showing the arrangement of the automatic equalizer 1011. As shown in FIG. 11, the automatic equalizer 1011 includes absolute value calculators 1021 and 1022, a multiplier 1023, a status determiner 1024, and an equalizer coefficient updater 1025.

The absolute value calculator 1021 receives the main speech signal 310, and outputs an absolute value signal 1026 corresponding to the absolute value of the strength of the main speech signal 310.

The absolute value calculator 1022 receives the sub speech signal 320, and outputs an absolute value signal 1027 corresponding to the absolute value of the strength of the sub speech signal 320.

The multiplier 1023 receives a correction coefficient signal 1038 output from the equalizer coefficient updater 1025, and outputs a signal 1029 obtained by multiplying the sub speech signal 320 by a correction coefficient represented by the correction coefficient signal 1038.

The status determiner 1024 receives the absolute value signals 1026 and 1027 and the signal 1029, and outputs an update enable/disable signal 1028 based on these signals. That is, if it is determined using the absolute value signals 1026 and 1027 and the signal 1029 that no wind noise is mixed in the main speech signal 310, the status determiner 1024 generates the update enable/disable signal 1028 representing that update is possible, and outputs the signal.

The equalizer coefficient updater 1025 includes smoothers (Avs) 1031 and 1032, a divider (Div) 1033, and a correction coefficient updater 1034.

The smoother 1031 receives the absolute value signal 1026, and outputs a smoothed signal 1035 obtained by smoothing the absolute value signal 1026 using, for example, leakage integration to estimate the envelope of this signal.

The smoother 1032 receives the absolute value signal 1027, and outputs a smoothed signal 1036 obtained by smoothing the absolute value signal 1027 using, for example, leakage integration to estimate the envelope of this signal.

The divider 1033 calculates the ratio between the smoothed signals 1035 and 1036, and outputs a value 1037 of the ratio. That is, the value 1037 of the ratio is output to determine how many times of the absolute value of the sub speech signal 320 is almost equal to the absolute value of the main speech signal.

The correction coefficient updater 1034 receives the value 1037 of the value and the update enable/disable signal 1028. When update becomes possible, the correction coefficient updater 1034 updates the correction value represented by the correction coefficient signal 1038 to the value 1037 of the ratio.

Thus, the signal 1029 output from the automatic equalizer 1011 is a signal having a volume almost equal to that of the main speech signal 310.

According to this example embodiment, if no predetermined amount of wind blows against the main microphone 202, that is, if no predetermined amount of wind noise is mixed in the main speech signal 310, the signal processor 1010 outputs the main speech signal 310. Alternatively, if the predetermined amount of wind noise is mixed in the main speech signal 310, the signal processor 1010 outputs the output signal 1029 of the automatic equalizer 1011. Therefore, the speech signal output from the signal processor 1010 is a signal with sufficiently reduced wind noise.

Eighth Example Embodiment

Figure 12:
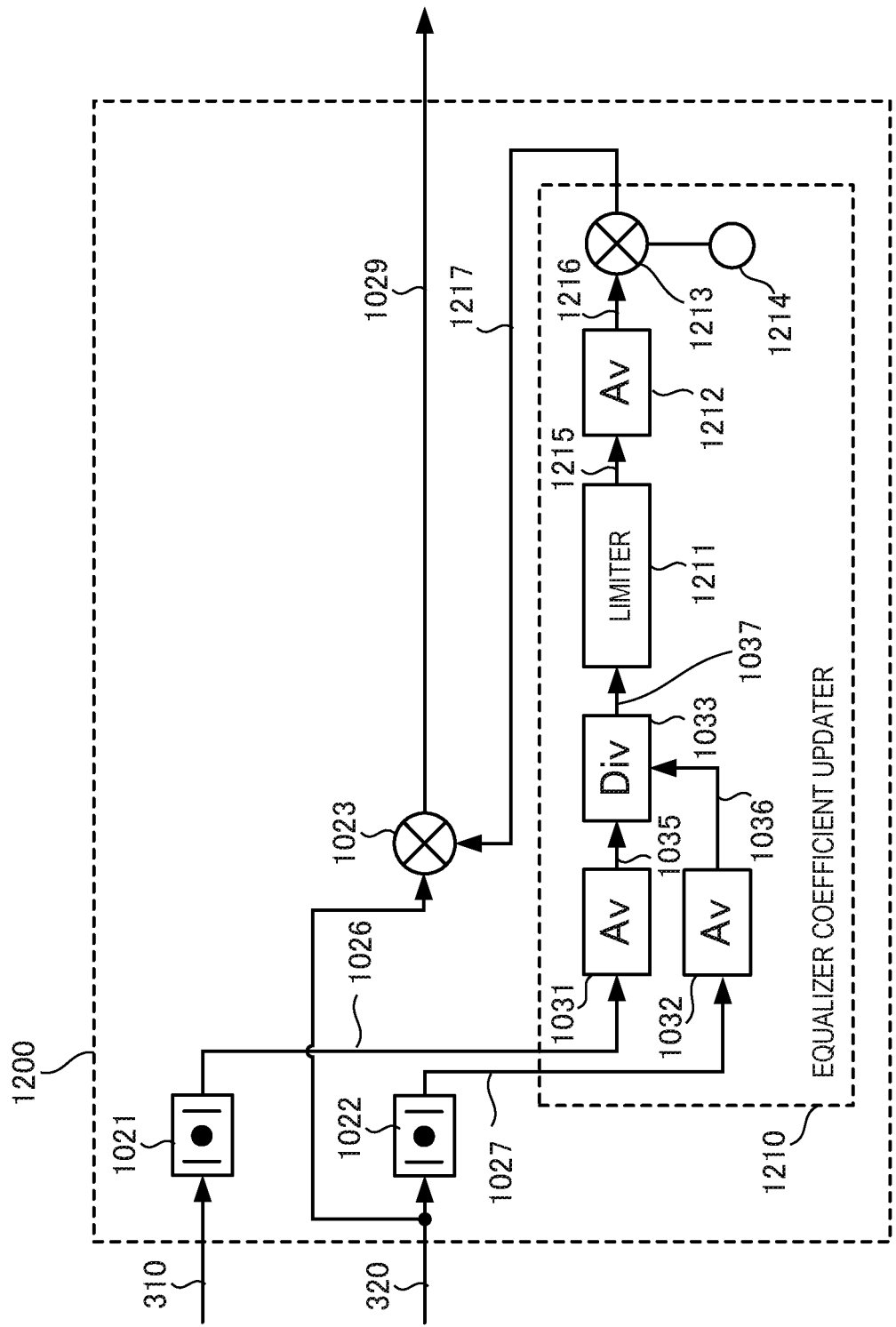
FIG. 12 is a block diagram showing the arrangement of an automatic equalizer according to the eighth example embodiment of the present invention.

A signal processing apparatus according to the eighth example embodiment of the present invention will be described next with reference to FIG. 12. FIG. 12 is a block diagram showing the arrangement of an automatic equalizer 1200 of the signal processing apparatus according to this example embodiment. The signal processing apparatus according to this example embodiment is different from that according to the above-described seventh example embodiment in that an automatic equalizer 1200 is provided instead of the automatic equalizer 1011. The remaining components and operations are the same as those in the seventh example embodiment. Hence, the same reference numerals denote the same components and operations, and a detailed description thereof will be omitted.

The automatic equalizer 1200 includes absolute value calculators 1021 and 1022, a multiplier 1023, and an equalizer coefficient updater 1210.

The multiplier 1023 receives a correction coefficient signal 1217 output from the equalizer coefficient updater 1210, and outputs a signal 1029 obtained by multiplying a sub speech signal 320 by a correction coefficient represented by the correction coefficient signal 1217.

The equalizer coefficient updater 1210 includes smoothers (Avs) 1031 and 1032, a divider (Div) 1033, a limiter 1211, a smoother 1212, and a multiplier 1213. The arrangement of the smoother 1212 is the same as that shown in FIG. 6C. In contrast to FIG. 6C, however, α that is difficult to increase and easy to decrease is set to prevent a smoothed signal 1216, based on which the correction coefficient is obtained, from becoming too large.

The limiter 1211 receives a value 1037 of a ratio. If the value 1037 of the ratio is smaller than a predetermined upper limit value, the value 1037 of the ratio is output as an output value 1215; otherwise, the limiter 1211 outputs the upper limit value as the output value 1215.

The smoother 1212 receives the output value 1215 from the limiter 1211, and outputs the smoothed signal 1216 obtained by smoothing the output value 1215 using, for example, leakage integration to estimate the envelope of the change of the value. The arrangement of the smoother 1212 is the same as that shown in FIG. 6C. In contrast to FIG. 6C, however, α that is difficult to increase and easy to decrease is set to prevent the smoothed signal 1216, based on which the correction coefficient is obtained, from becoming too large.

The multiplier 1213 receives the smoothed signal 1216, generates a correction coefficient signal 1217 by multiplying the smoothed signal 1216 by a predetermined constant 1214 that has been preset, and outputs the generated signal.

According to this example embodiment as well, it is possible to obtain the same effect as in the seventh example embodiment. A speech signal output from a signal processor 1010 is a signal with sufficiently reduced wind noise.

Ninth Example Embodiment

Figure 13:
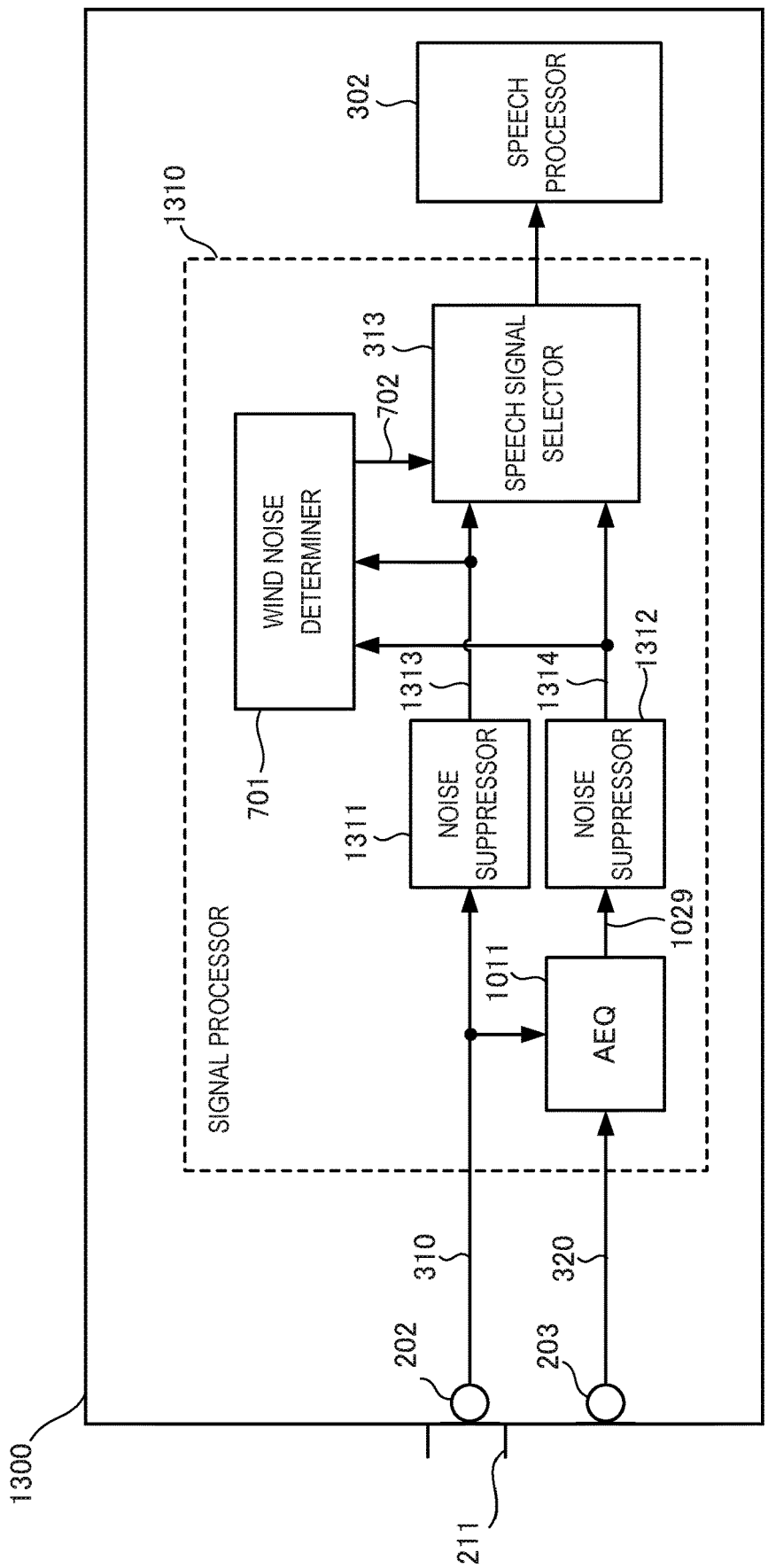
FIG. 13 is a block diagram showing the arrangement of a signal processing apparatus according to the ninth example embodiment of the present invention.

A signal processing apparatus according to the ninth example embodiment of the present invention will be described next with reference to FIG. 13. FIG. 13 is a block diagram showing the overall arrangement of a signal processing apparatus 1300. The signal processing apparatus 1300 according to this example embodiment is different from that according to the above-described seventh example embodiment in that a signal processor 1310 formed by arranging two noise suppressors 1311 and 1312 in the signal processor 1010 is provided. The remaining components and operations are the same as those in the seventh example embodiment. Hence, the same reference numerals denote the same components and operations, and a detailed description thereof will be omitted.

The noise suppressor 1311 receives a main speech signal 310, generates a speech signal 1313 by suppressing the noise component of the main speech signal 310, and outputs the generated signal.

The noise suppressor 1312 receives a signal 1029, generates a speech signal 1314 by suppressing the noise component of the signal 1029, and outputs the generated signal.

According to this example embodiment, noise in the main speech signal 310 and that in the output signal 1029 of an automatic equalizer 1011 are suppressed, thereby further reducing the noise components. Therefore, according to this example embodiment as well, it is possible to obtain the same effect as in the seventh example embodiment. A speech signal output from the signal processor 1310 is a speech signal with sufficiently reduced wind noise.

Note that even if the noise suppressor 1312 is arranged at the preceding stage of the automatic equalizer 1011, it is possible to obtain the same effect.

10th Example Embodiment

Figure 14:
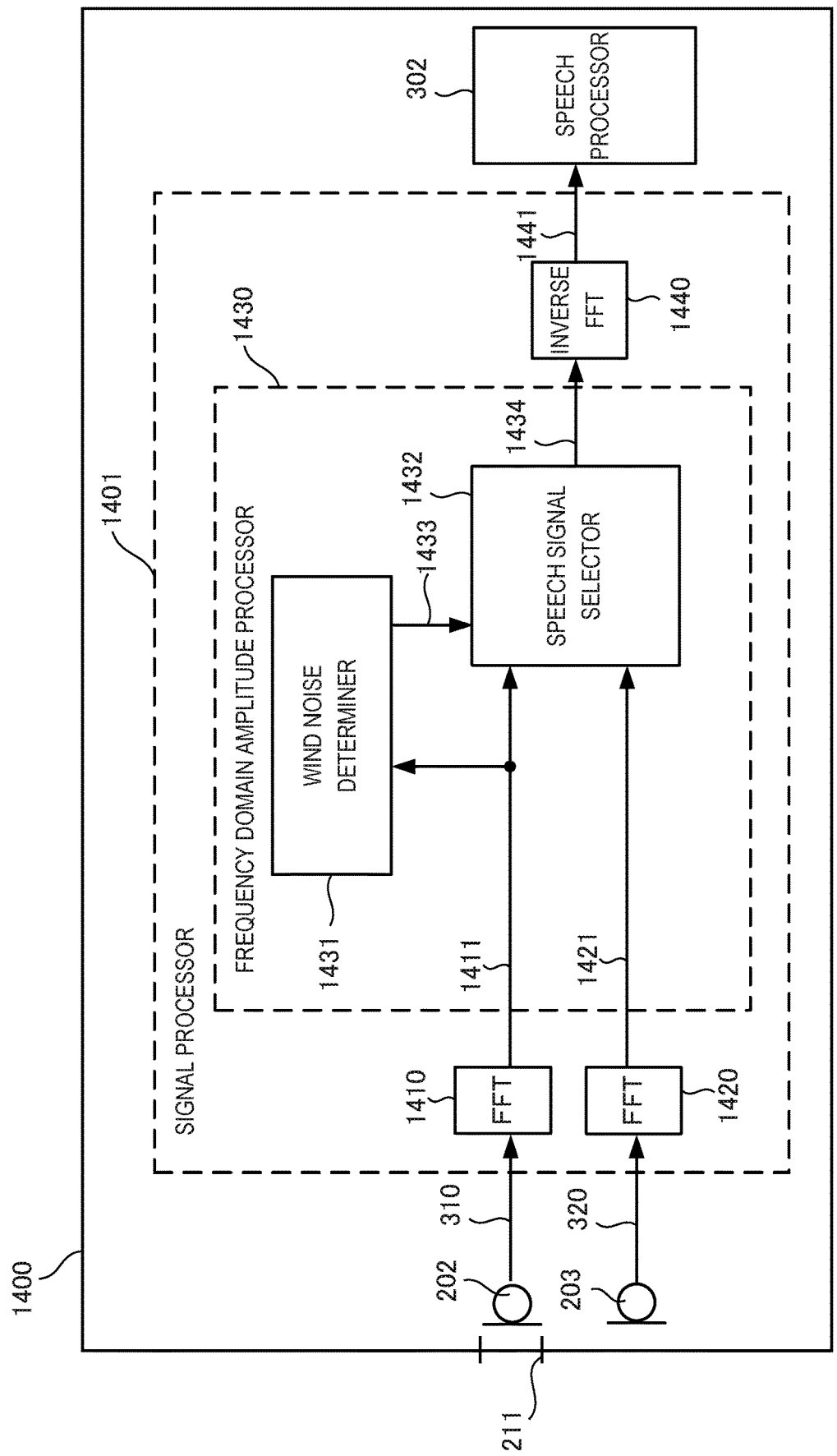
FIG. 14 is a block diagram showing the arrangement of a signal processing apparatus according to the 10th example embodiment of the present invention.

A signal processing apparatus according to the 10th example embodiment of the present invention will be described next with reference to FIG. 14. FIG. 14 is a block diagram showing the overall arrangement of a signal processing apparatus 1400. The signal processing apparatus 1400 according to this example embodiment is provided in a smartphone, as in the second example embodiment. The same components as in the second example embodiment are denoted by the same reference numerals, and a description thereof will be omitted. This example embodiment is different from the second example embodiment in that a signal processor 1401 is provided instead of the signal processor 301.

As shown in FIG. 14, the signal processor 1401 includes Fourier transformers (FFTs: Fast Fourier Transform) 1410 and 1420, a frequency domain amplitude processor 1430, and an inverse Fourier transformer (inverse FFT) 1440.

The Fourier transformer 1410 receives a main speech signal 310, and outputs a signal 1411 obtained by Fourier-transforming the main speech signal 310.

The Fourier transformer 1420 receives a sub speech signal 320, and outputs a signal 1421 obtained by Fourier-transforming the sub speech signal 320.

When a speech signal is Fourier-transformed by the Fourier transformer 1410 or 1420, as described above, the speech signal is divided into a plurality of frequency components having predetermined amplitudes.

The inverse Fourier transformer (inverse FFT) 1440 receives a signal 1434 output from the frequency domain amplitude processor 1430, generates a signal 1441 by inversely Fourier-transforming the signal 1434, and outputs the generated signal.

The frequency domain amplitude processor 1430 includes a wind noise determiner 1431 and a speech signal selector 1432.

The wind noise determiner 1431 receives the Fourier-transformed signal 1411, and compares the amplitude value of the signal with a predetermined threshold for each of the predetermined number of divided frequency domains. Furthermore, the wind noise determiner 1431 determines, if the amplitude value is equal to or larger than the threshold, that wind noise is mixed in the signal in the frequency domain, and outputs a signal 1433 representing a determination result for each frequency domain.

The speech signal selector 1432 receives the Fourier-transformed signals 1411 and 1412 and the signal 1433. Based on the determination result represented by the signal 1433, the speech signal selector 1432 selects one of the Fourier-transformed signals 1411 and 1421 for each of the predetermined number of divided frequency domains. After that, the speech signal selector 1432 generates the signal 1434 combined with the selected signal, and outputs the generated signal.

According to this example embodiment, for each of the predetermined number of divided frequency domains, the presence/absence of a predetermined amount of wind noise is determined to select a signal in which no predetermined amount of wind noise is mixed. Thus, the speech signal 1441 output from the inverse Fourier transformer 1440 is a speech signal with sufficiently reduced wind noise.

11th Example Embodiment

Figure 15:
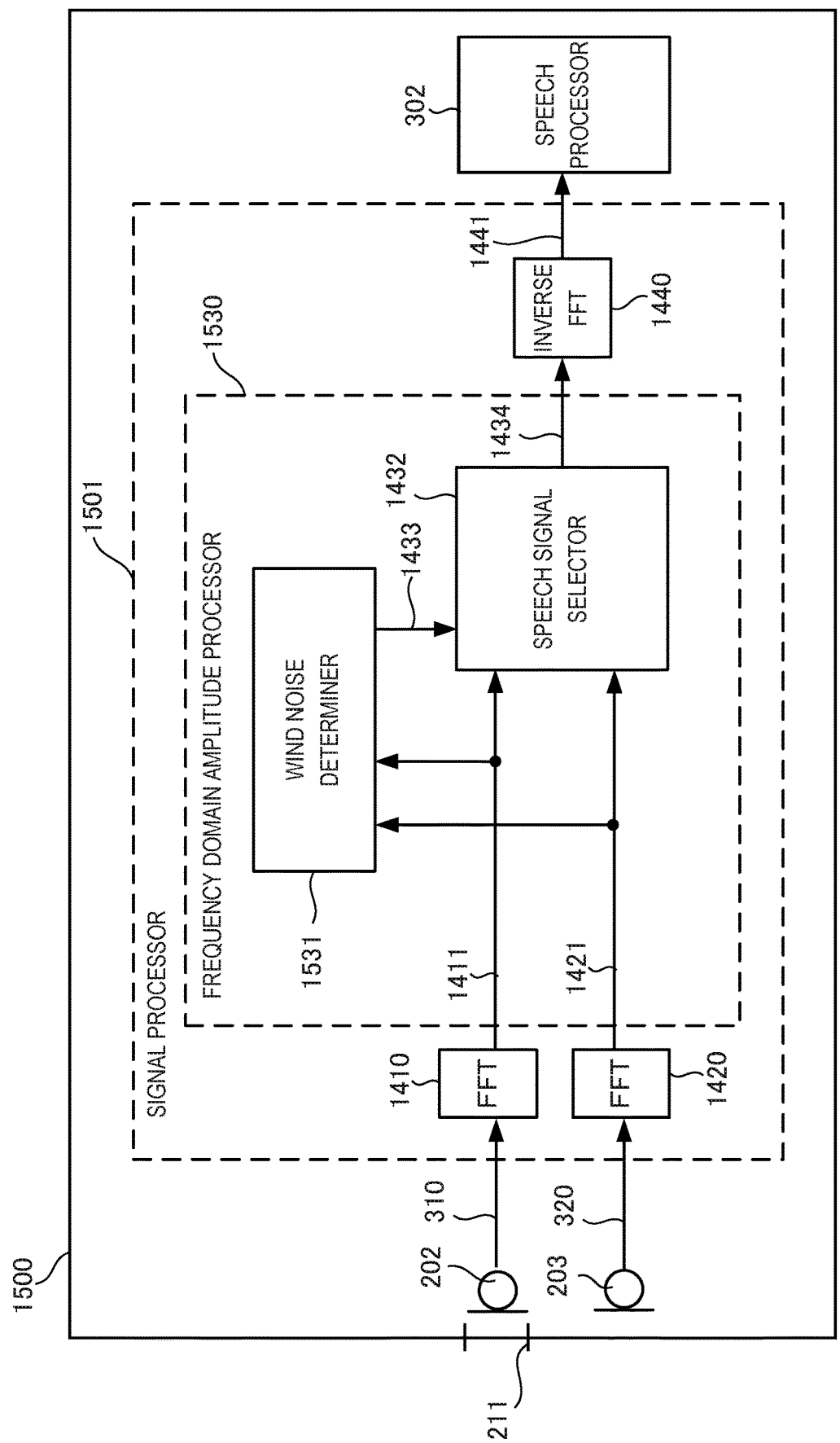
FIG. 15 is a block diagram showing the arrangement of a signal processing apparatus according to the 11th example embodiment of the present invention.

A signal processing apparatus according to the 11th example embodiment of the present invention will be described next with reference to FIG. 15. FIG. 15 is a block diagram showing the overall arrangement of a signal processing apparatus 1500. The signal processing apparatus 1500 according to this example embodiment is different from that according to the above-described 10th example embodiment in that a frequency domain amplitude processor 1530 including a wind noise determiner 1531 instead of the wind noise determiner 1431 of the frequency domain amplitude processor 1430 is provided. The remaining components and operations are the same as those in the 10th example embodiment. Hence, the same reference numerals denote the same components and operations, and a detailed description thereof will be omitted.

The frequency domain amplitude processor 1530 includes the wind noise determiner 1531 and a speech signal selector 1432.

The wind noise determiner 1531 receives Fourier-transformed signals 1411 and 1421. Furthermore, the wind noise determiner 1531 multiplies, by a preset constant, the amplitude value of the signal 1421 obtained by Fourier-transforming a sub speech signal 320, thereby generating a signal having an amplitude value slightly smaller than an amplitude value obtained when no predetermined amount of wind noise is mixed in a main speech signal 310. In addition, the wind noise determiner 1531 compares, for each frequency domain, the amplitude of the signal generated from the signal 1421 with that of the signal 1411 to determine for each frequency domain whether wind noise is mixed in the signal 1411, and outputs a signal 1433 representing a determination result for each frequency domain. The wind noise determiner 1531 may perform common or cooperative processing with another frequency instead of performing processing for each frequency.

The speech signal selector 1432 receives the Fourier-transformed signal 1411, a Fourier-transformed signal 1421, and the signal 1433. Based on the determination result represented by the signal 1433, the speech signal selector 1432 selects one of the Fourier-transformed signals 1411 and 1421 for each of the predetermined number of divided frequency domains. After that, the speech signal selector 1432 generates a signal 1434 combined with the selected signal, and outputs the generated signal.

According to this example embodiment, for each frequency domain, the presence/absence of wind noise is determined to select the signal in which no wind noise is mixed. Thus, a speech signal 1441 output from an inverse Fourier transformer 1440 is a speech signal with sufficiently reduced wind noise.

12th Example Embodiment

Figure 16:
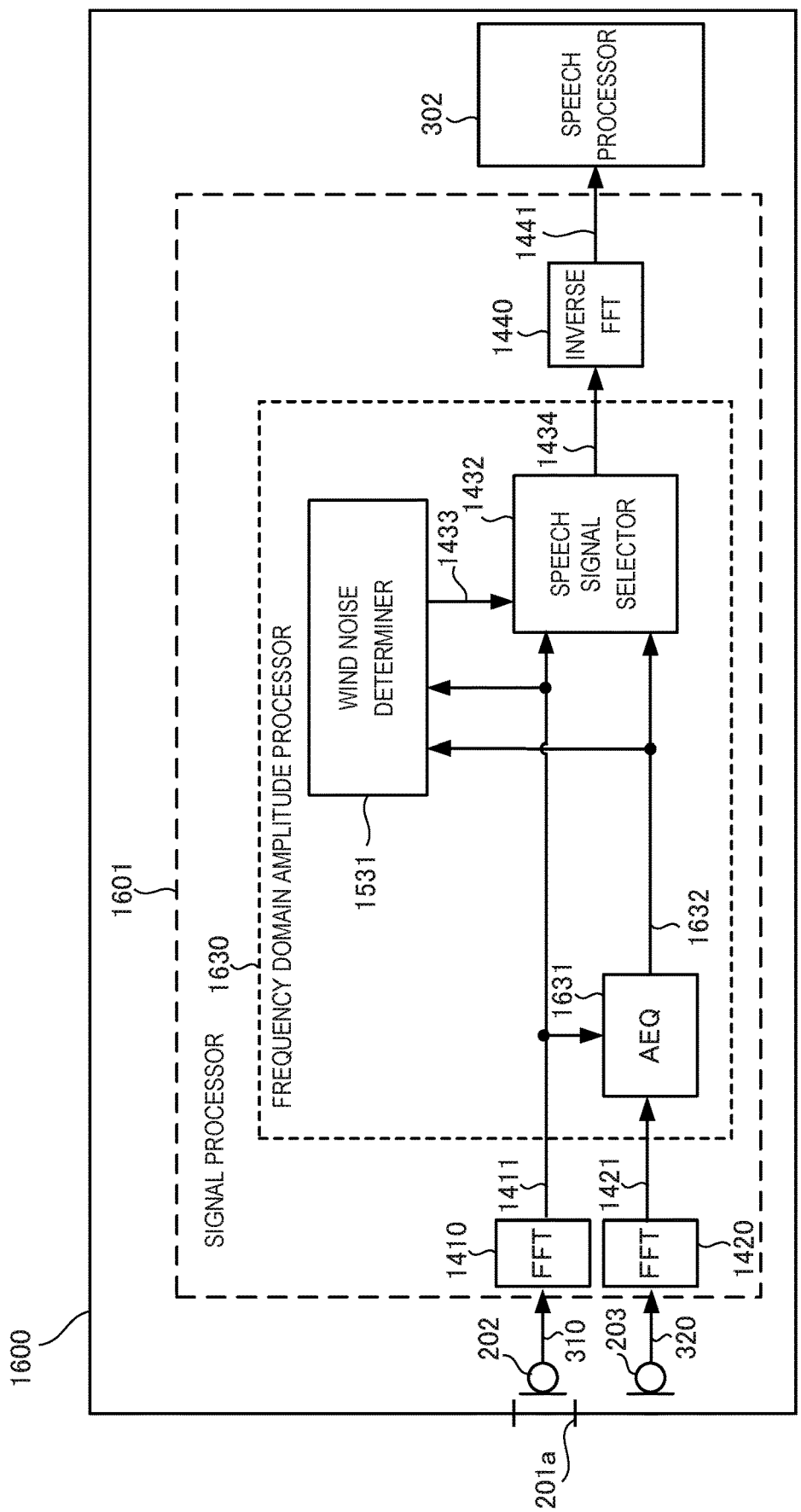
FIG. 16 is a block diagram showing the arrangement of a signal processing apparatus according to the 12th example embodiment of the present invention.

A signal processing apparatus according to the 12th example embodiment of the present invention will be described with reference to FIG. 16. FIG. 16 is a block diagram showing the overall arrangement of a signal processing apparatus 1600. The signal processing apparatus 1600 according to this example embodiment is different from that according to the above-described 11th example embodiment in that a signal processor 1601 including a frequency domain amplitude processor 1630 with an automatic equalizer (AEQ) 1631 is provided. The remaining components and operations are the same as those in the 11th example embodiment.

Hence, the same reference numerals denote the same components and operations, and a detailed description thereof will be omitted.

The automatic equalizer 1631 receives a signal 1411 obtained by Fourier-transforming a main speech signal 310 and a signal 1421 obtained by Fourier-transforming a sub speech signal 320. Furthermore, for each frequency domain, the automatic equalizer 1631 outputs a signal 1632 obtained by correcting the frequency characteristic of the signal 1421 based on the signal 1411. The automatic equalizer 1011 described with reference to FIG. 13 corrects the volume. To the contrary, the automatic equalizer 1631 corrects a volume for each frequency, which means that the frequency characteristic is corrected.

A wind noise determiner 1531 receives the signal 1411 obtained by Fourier-transforming the main speech signal 310 and the signal 1632 obtained by Fourier-transforming the sub speech signal 320. Furthermore, the wind noise determiner 1531 multiplies the amplitude value of the signal 1632 by a preset constant, thereby generating a signal having an amplitude value slightly smaller than an amplitude value obtained when no predetermined amount of wind noise is mixed in the main speech signal 310. In addition, the wind noise determiner 1531 compares, for each frequency domain, the amplitude of the signal generated from the signal 1632 with that of the signal 1411. Then, the wind noise determiner 1531 determines, for each frequency domain, whether the predetermined amount of wind noise is mixed in the signal 1411, and outputs a signal 1433 representing a determination result for each frequency domain.

A speech signal selector 1432 receives the signals 1411 and 1632 and the signal 1433, and selects, for each frequency domain, based on the determination result represented by the signal 1433, one of the signals 1411 and 1632, in which no predetermined amount of wind noise is mixed. The speech signal selector 1432 generates a signal 1434 combined with the selected signal, and outputs the generated signal.

According to this example embodiment, for each frequency domain, the presence/absence of wind noise is determined to select the signal in which no predetermined amount of wind noise is mixed. Thus, a speech signal 1441 output from an inverse Fourier transformer 1440 is a speech signal with sufficiently reduced wind noise.

13th Example Embodiment

Figure 17:
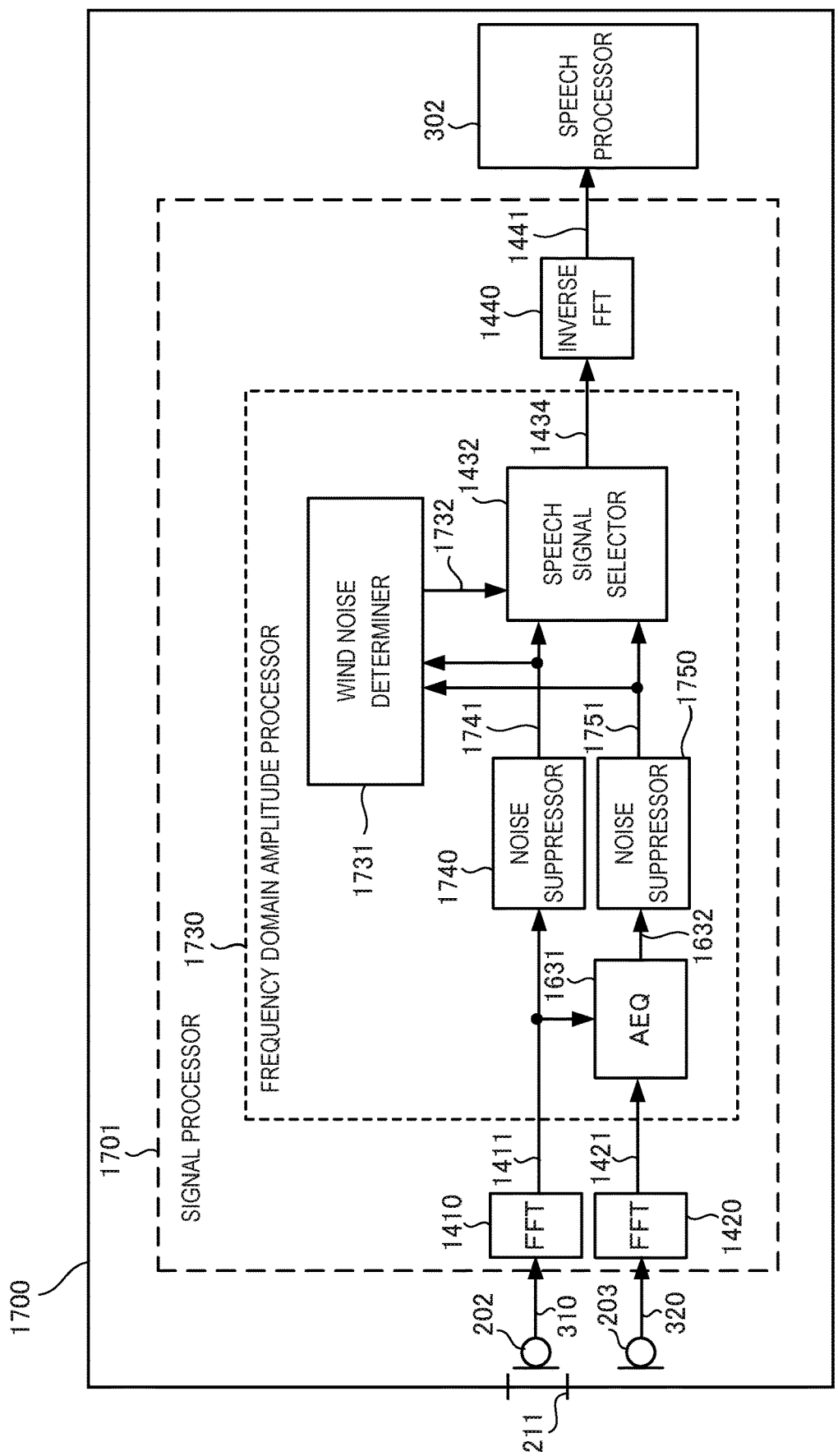
FIG. 17 is a block diagram showing the arrangement of a signal processing apparatus according to the 13th example embodiment of the present invention.

A signal processing apparatus according to the 13th example embodiment of the present invention will be described next with reference to FIG. 17. FIG. 17 is a block diagram showing the overall arrangement of a signal processing apparatus 1700. The signal processing apparatus 1700 according to this example embodiment is different from that according to the 12th example embodiment in that a frequency domain amplitude processor 1730 including noise suppressors 1740 and 1750 is provided. The remaining components and operations are the same as those in the 12th example embodiment. Hence, the same reference numerals denote the same components and operations, and a detailed description thereof will be omitted.

The noise suppressor 1740 receives a signal 1411 obtained by Fourier-transforming a main speech signal 310, generates a signal 1741 by suppressing the noise component of the signal 1411 for each frequency domain, and outputs the generated signal.

The noise suppressor 1750 receives an output signal 1632 from an automatic equalizer 1631, generates a signal 1751 by suppressing the noise component of the signal 1632 for each frequency domain, and outputs the generated signal.

A wind noise determiner 1731 receives the output signal 1741 of the noise suppressor 1740 and the output signal 1751 of the noise suppressor 1750. Furthermore, the wind noise determiner 1731 multiplies the amplitude value of the signal 1751 by a preset constant, thereby generating a signal having an amplitude value slightly smaller than an amplitude value obtained when no predetermined amount of wind noise is mixed in the main speech signal 310. In addition, the wind noise determiner 1731 compares, for each frequency domain, the amplitude of the signal generated from the signal 1751 with that of the signal 1741 to determine for each frequency domain whether wind noise is mixed in the signal 1741, and outputs a signal 1732 representing a determination result for each frequency domain.

A speech signal selector 1432 receives the signals 1741 and 1751 and the signal 1732, and selects, for each frequency domain, based on the determination result represented by the signal 1732, one of the signals 1741 and 1751, in which no predetermined amount of wind noise is mixed. The speech signal selector 1432 generates the signal 1434 combined with the selected signal, and outputs the generated signal.

According to this example embodiment, for each frequency domain, the presence/absence of wind noise is determined to select the signal in which no wind noise is mixed. Thus, a speech signal 1441 output from an inverse Fourier transformer 1440 is a speech signal with sufficiently reduced wind noise.

14th Example Embodiment

Figure 18:
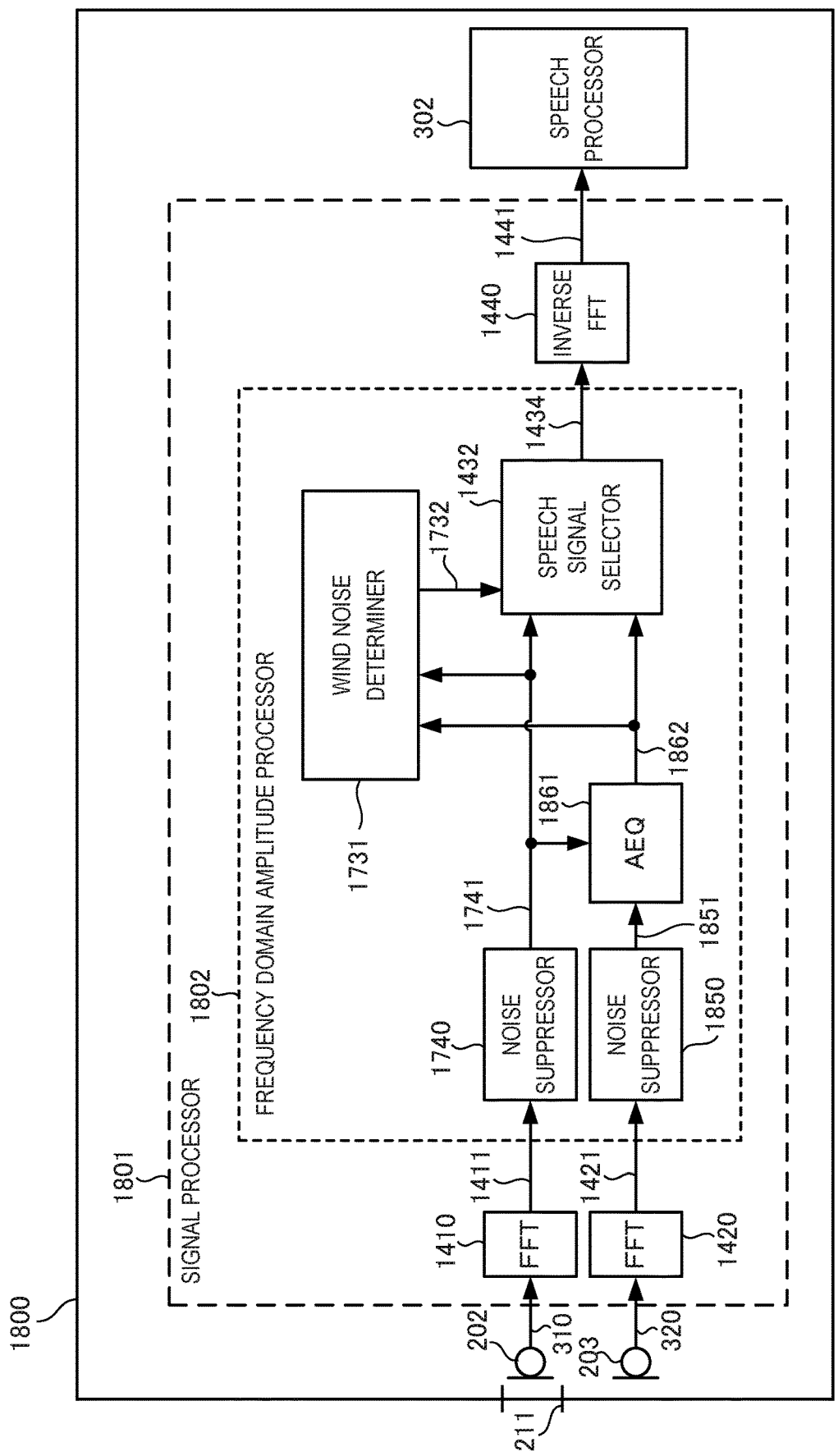
FIG. 18 is a block diagram showing the arrangement of a signal processing apparatus according to the 14th example embodiment of the present invention.

A signal processing apparatus according to the 14th example embodiment of the present invention will be described next with reference to FIG. 18. FIG. 18 is a block diagram showing the overall arrangement of a signal processing apparatus 1800. The signal processing apparatus 1800 according to this example embodiment is different from that according to the above-described 13th example embodiment in that the locations of noise suppressors and an automatic equalizer (AEQ) are reversed.

That is, a frequency domain amplitude processor 1802 of the signal processing apparatus 1800 includes a wind noise determiner 1731, a speech signal selector 1432, noise suppressors 1740 and 1850, and an automatic equalizer (AEQ) 1861. The remaining components and operations are the same as those in the 13th example embodiment. Hence, the same reference numerals denote the same components and operations, and a detailed description thereof will be omitted.

The noise suppressor 1850 receives a signal 1421 obtained by Fourier-transforming a sub speech signal 320, generates a signal 1851 by suppressing the noise component of the signal 1421 for each frequency domain, and outputs the generated signal.

The automatic equalizer 1861 receives a signal 1741 and the signal 1851, and outputs, for each frequency domain, a signal 1862 obtained by correcting the frequency characteristic of the signal 1851 based on the signal 1741.

The wind noise determiner 1731 receives the output signal 1741 of the noise suppressor 1740 and an output signal 1862 of the automatic equalizer 1861. Furthermore, the wind noise determiner 1731 multiplies the amplitude value of the signal 1862 by a preset constant, and generates a signal having an amplitude value slightly smaller than an amplitude value obtained when no predetermined amount of wind noise is mixed in a main speech signal 310. In addition, for each frequency domain, the wind noise determiner 1731 compares the amplitude of the signal generated from the signal 1862 with that of the signal 1741. Then, the wind noise determiner 1731 determines, for each frequency domain, whether the predetermined amount of wind noise is mixed in the signal 1741, and outputs a signal 1732 representing a determination result for each frequency domain.

The speech signal selector 1432 receives the signals 1741 and 1862 and the signal 1732, and selects, for each frequency domain, based on the determination result represented by the signal 1732, one of the signals 1741 and 1862, in which no predetermined amount of wind noise is mixed. The speech signal selector 1432 generates a signal 1434 combined with the selected signal, and outputs the generated signal.

According to this example embodiment, for each frequency domain, the presence/absence of wind noise is determined to select the signal in which no wind noise is mixed. Thus, a speech signal 1441 output from an inverse Fourier transformer 1440 is a speech signal with sufficiently reduced wind noise.

15th Example Embodiment

Figure 19:
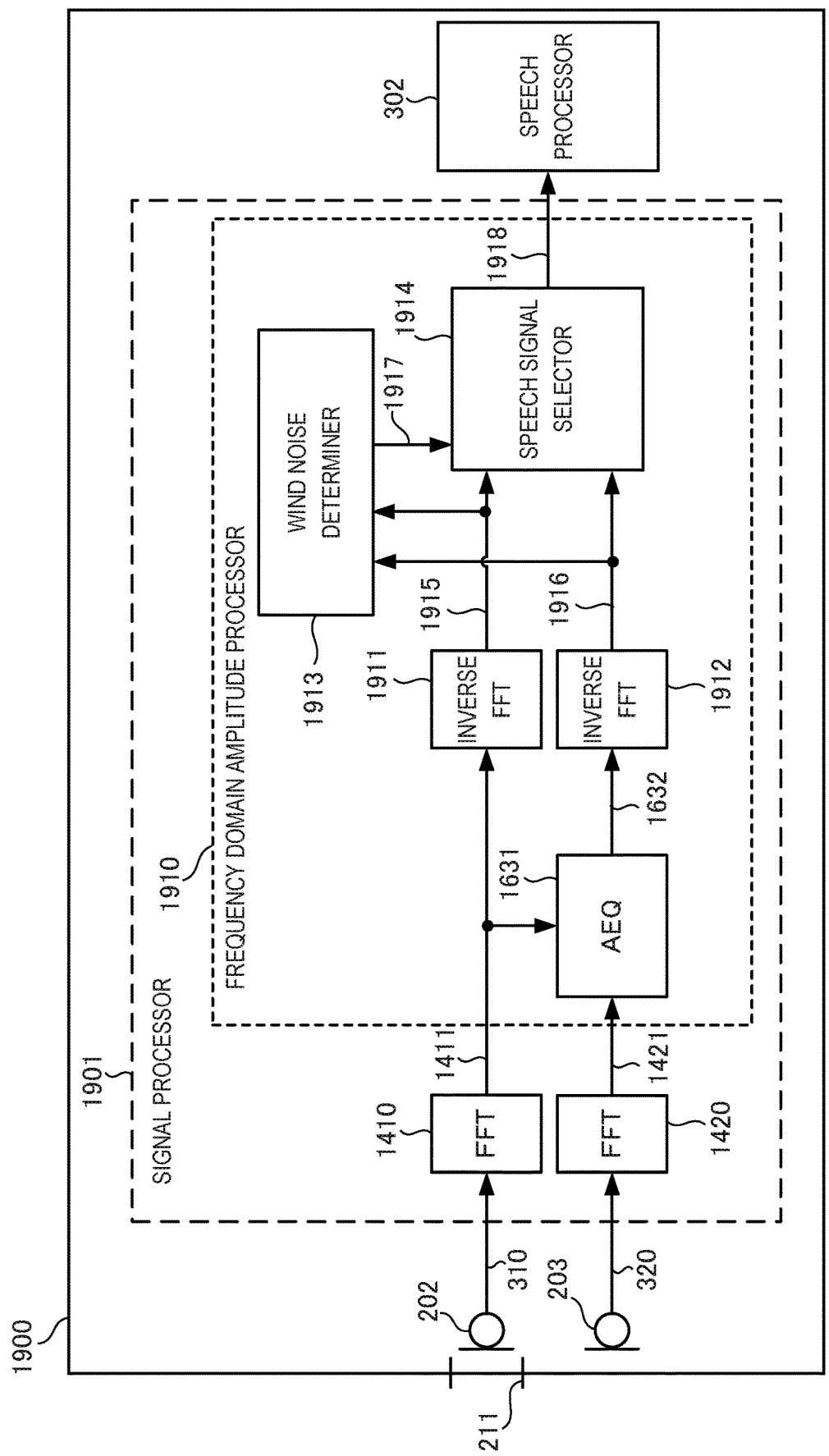
FIG. 19 is a block diagram showing the arrangement of a signal processing apparatus according to the 15th example embodiment of the present invention.

A signal processing apparatus according to the 15th example embodiment of the present invention will be described next with reference to FIG. 19. FIG. 19 is a block diagram showing the overall arrangement of a signal processing apparatus 1900. The signal processing apparatus 1900 according to this example embodiment is different from that according to the 14th example embodiment in that a frequency domain amplitude processor 1910 including an inverse Fourier transformer (inverse FFT) is provided at the preceding stage of a speech signal selector. That is, the frequency domain amplitude processor 1910 includes an automatic equalizer (AEQ) 1631, inverse Fourier transformers 1911 and 1912, a wind noise determiner 1913, and a speech signal selector 1914. Components and their operations denoted by the same reference numerals as in the 14th example embodiment are the same as those in the 14th example embodiment, and a detailed description thereof will be omitted.

The inverse Fourier transformer 1911 receives a signal 1411 Fourier-transformed by a Fourier transformer 1410, and outputs a signal 1915 obtained by inversely Fourier-transforming the signal 1411.

The inverse Fourier transformer 1912 receives an output signal 1632 from the automatic equalizer 1631, and outputs a signal 1916 obtained by Fourier-transforming the signal 1632.

The wind noise determiner 1913 receives the output signal 1915 of the inverse Fourier transformer 1911 and the output signal 1916 of the inverse Fourier transformer 1912. Furthermore, the wind noise determiner 1913 multiplies the amplitude value of the signal 1916 by a preset constant, thereby generating a signal having an amplitude value slightly smaller than an amplitude value obtained when no predetermined amount of wind noise is mixed in a main speech signal 310. In addition, for each frequency domain, the wind noise determiner 1913 compares the amplitude of the signal generated from the signal 1916 with that of the signal 1915. Then, the wind noise determiner 1913 determines, for each frequency domain, whether the predetermined amount of wind noise is mixed in the signal 1915, and outputs a signal 1917 representing a determination result for each frequency domain.

The speech signal selector 1914 receives the signals 1915 and 1916 and the signal 1917, and selects, for each frequency domain, based on the determination result represented by the signal 1917, one of the signals 1915 and 1916, in which no predetermined amount of wind noise is mixed. The speech signal selector 1914 generates a signal 1918 combined with the selected signal, and outputs the generated signal.

According to this example embodiment, for each frequency domain, the presence/absence of wind noise is determined to select the signal in which no wind noise is mixed. Thus, the speech signal 1918 output from the speech signal selector 1914 is a speech signal with sufficiently reduced wind noise.

16th Example Embodiment

Figure 20:
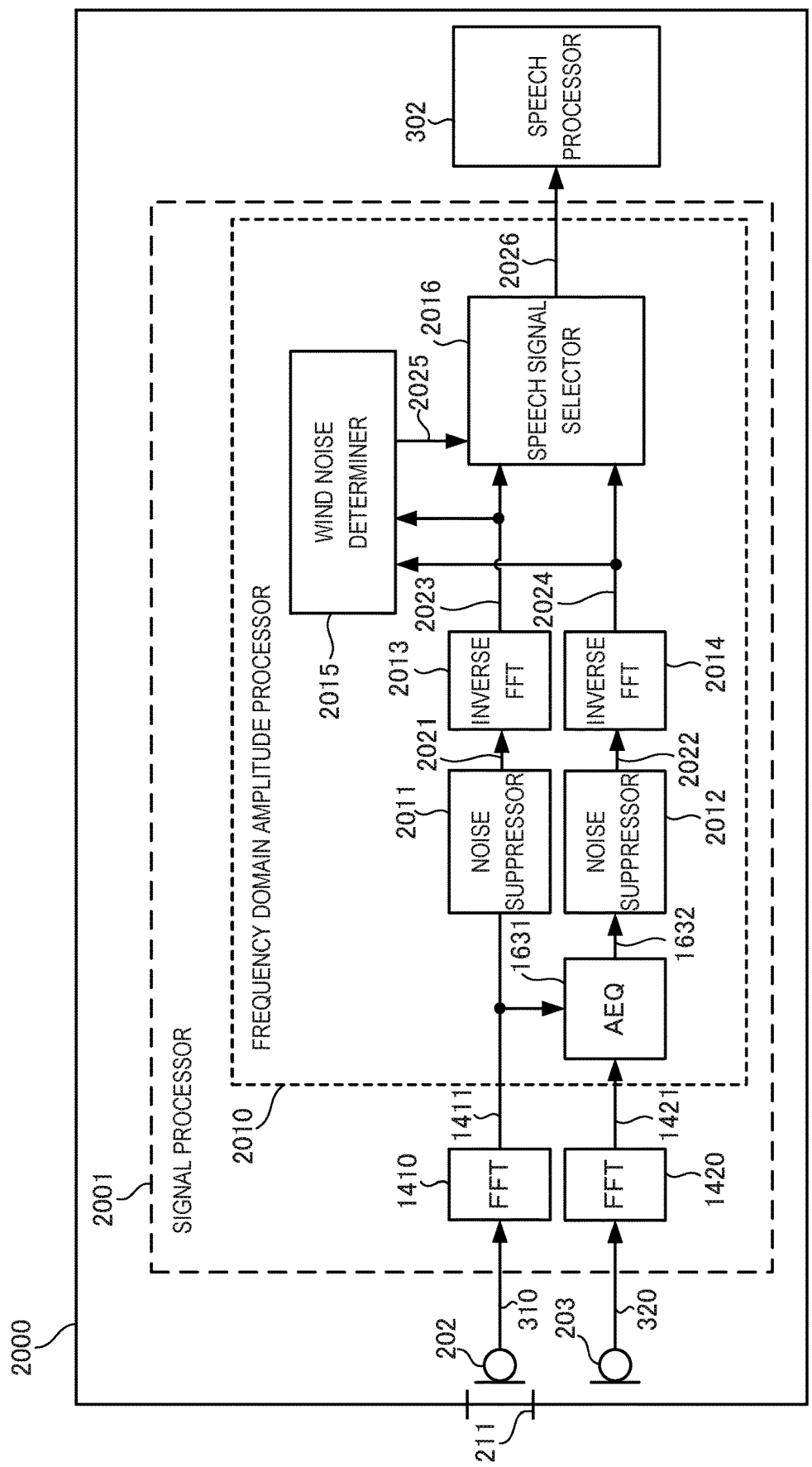
FIG. 20 is a block diagram showing the arrangement of a signal processing apparatus according to the 16th example embodiment of the present invention.

A signal processing apparatus according to the 16th example embodiment of the present invention will be described next with reference to FIG. 20. FIG. 20 is a block diagram showing the overall arrangement of a signal processing apparatus 2000. The signal processing apparatus 2000 according to this example embodiment is different from that according to the above-described 15th example embodiment in that noise suppressors are provided at the preceding stage of inverse Fourier transformers.

That is, a frequency domain amplitude processor 2010 includes an automatic equalizer 1631, noise suppressors 2011 and 2012, inverse Fourier transformers (inverse FFTs) 2013 and 2014, a wind noise determiner 2015, and a speech signal selector 2016. Components and their operations denoted by the same reference numerals as in the 15th example embodiment are the same as those in the 15th example embodiment, and a detailed description thereof will be omitted.

The noise suppressor 2011 receives a signal 1441, generates a signal 2021 by suppressing the noise component of the signal 1441 for each predetermined frequency domain, and outputs the generated signal.

The noise suppressor 2012 receives a signal 1632, generates a signal 2022 by suppressing the noise components of the signal 1632 for each frequency domain, and outputs the generated signal.

The inverse Fourier transformer 2013 receives the signal 2021, and outputs a signal 2023 obtained by inversely Fourier-transforming the signal 2021.

The inverse Fourier transformer 2014 receives the signal 2022, and outputs a signal 2024 obtained by inversely Fourier-transforming the signal 2022.

The wind noise determiner 2015 receives the output signal 2023 of the inverse Fourier transformer 2013 and the output signal 2024 of the inverse Fourier transformer 2014. Furthermore, the wind noise determiner 2015 multiplies the amplitude value of the signal 2022 by a preset constant, thereby generating a signal having an amplitude value slightly smaller than an amplitude value obtained when no predetermined amount of wind noise is mixed in a main speech signal 310. In addition, for each frequency domain, the wind noise determiner 2015 compares the amplitude of the signal generated from the signal 2024 with that of the signal 2023. Then, the wind noise determiner 2015 determines, for each frequency domain, whether the predetermined amount of wind noise is mixed in the signal 2023, and outputs a signal 2025 representing a determination result for each frequency domain.

The speech signal selector 2016 receives the signals 2023 and 2024 and the signal 2025, and selects, for each frequency domain, based on the determination result represented by the signal 2025, one of the signals 2023 and 2024, in which no predetermined amount of wind noise is mixed. The speech signal selector 2016 generates a signal 2026 combined with the selected signal, and outputs the generated signal.

According to this example embodiment, the speech signal 2026 output from the speech signal selector 2016 is a speech signal with sufficiently reduced wind noise.

17th Example Embodiment

Figure 21:
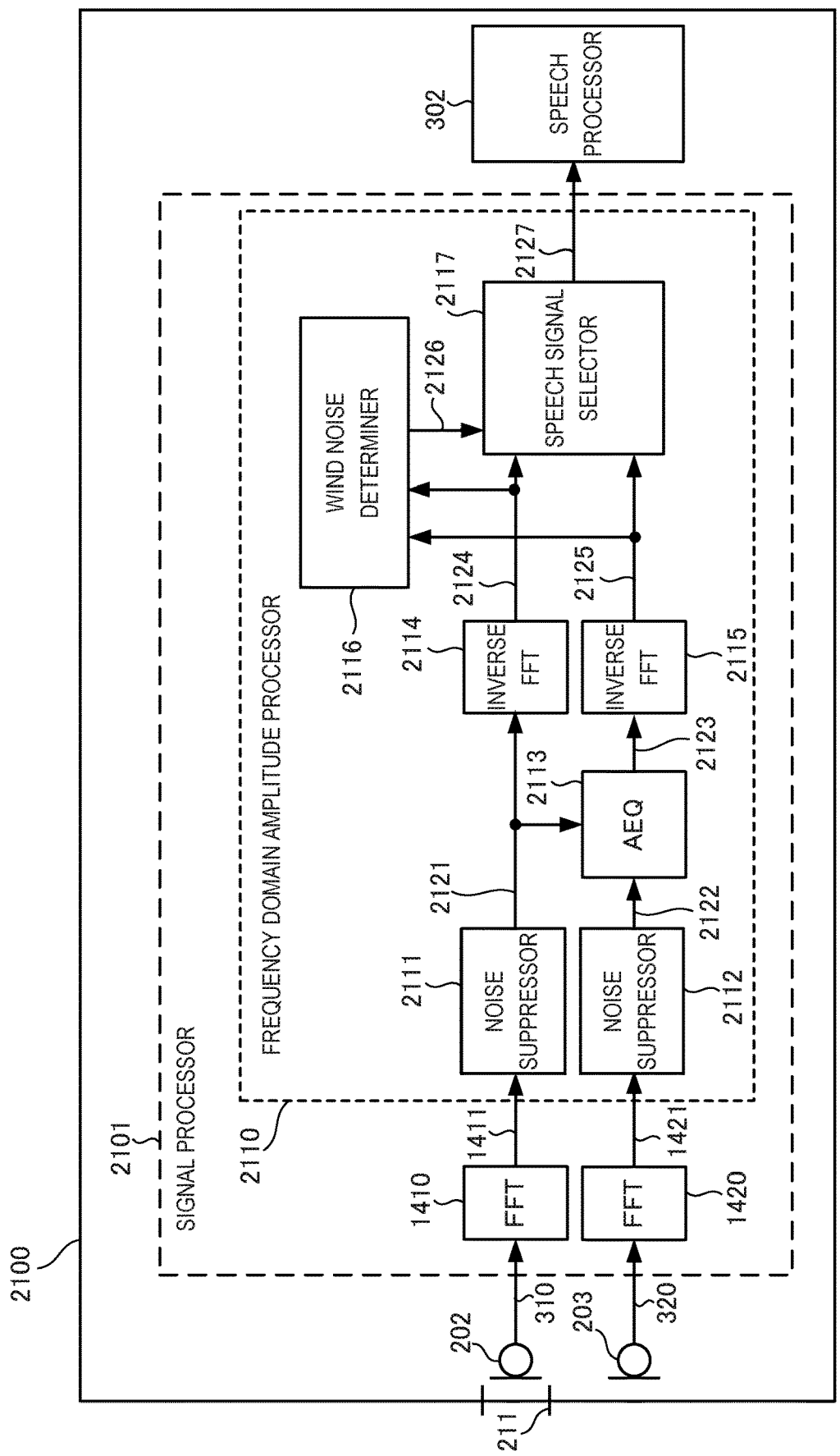
FIG. 21 is a block diagram showing the arrangement of a signal processing apparatus according to the 17th example embodiment of the present invention.

A signal processing apparatus according to the 17th example embodiment of the present invention will be described next with reference to FIG. 21. FIG. 21 is a block diagram showing the overall arrangement of a signal processing apparatus 2100. The signal processing apparatus 2100 according to this example embodiment is different from that according to the above-described 16th example embodiment in that noise suppressors are provided at the preceding stage of an automatic equalizer.

That is, a frequency domain amplitude processor 2110 includes noise suppressors 2111 and 2112, an automatic equalizer (AEQ) 2113, inverse Fourier transformers (inverse FFTs) 2114 and 2115, a wind noise determiner 2116, and a speech signal selector 2117. Components and their operations denoted by the same reference numerals as in the 16th example embodiment are the same as those in the 16th example embodiment, and a detailed description thereof will be omitted.

The noise suppressor 2111 receives a signal 1441, generates a signal 2121 by suppressing the noise component of the signal 1441 for each predetermined frequency domain, and outputs the generated signal.

The noise suppressor 2112 receives a signal 1421, generates a signal 2122 by suppressing the noise component of the signal 1421 for each frequency domain, and outputs the generated signal.

The automatic equalizer 2113 receives the signals 2121 and 2122, and outputs, for each frequency domain, a signal 2123 obtained by correcting the frequency characteristic of the signal 2122 based on the signal 2121.

The inverse Fourier transformer 2114 receives the signal 2121, and outputs a signal 2124 obtained by inversely Fourier-transforming the signal 2121.

The inverse Fourier transformer 2115 receives the signal 2123, and outputs a signal 2125 obtained by inversely Fourier-transforming the signal 2123.

The wind noise determiner 2116 receives the output signal 2124 of the inverse Fourier transformer 2114 and the output signal 2125 of the inverse Fourier transformer 2115. Furthermore, the wind noise determiner 2116 multiplies the amplitude value of the signal 2125 by a preset constant, thereby generating a signal having an amplitude value slightly smaller than an amplitude value obtained when no predetermined amount of wind noise is mixed in a main speech signal 310. In addition, the wind noise determiner 2116 compares the amplitude of the signal generated from the signal 2125 with that of the signal 2124. Then, the wind noise determiner 2116 determines whether the predetermined amount of wind noise is mixed in the signal 2124, and outputs a signal 2126 representing a determination result.

The speech signal selector 2117 receives the signals 2124 and 2125 and the signal 2126, and selects, based on the determination result represented by the signal 2126, one of the signals 2124 and 2125, in which no predetermined amount of wind noise is mixed. The speech signal selector 2117 outputs the selected signal as a speech signal 2127.

According to this example embodiment as well, the speech signal 2127 output from the speech signal selector 2117 is a speech signal with sufficiently reduced wind noise.

18th Example Embodiment

Figure 22A:
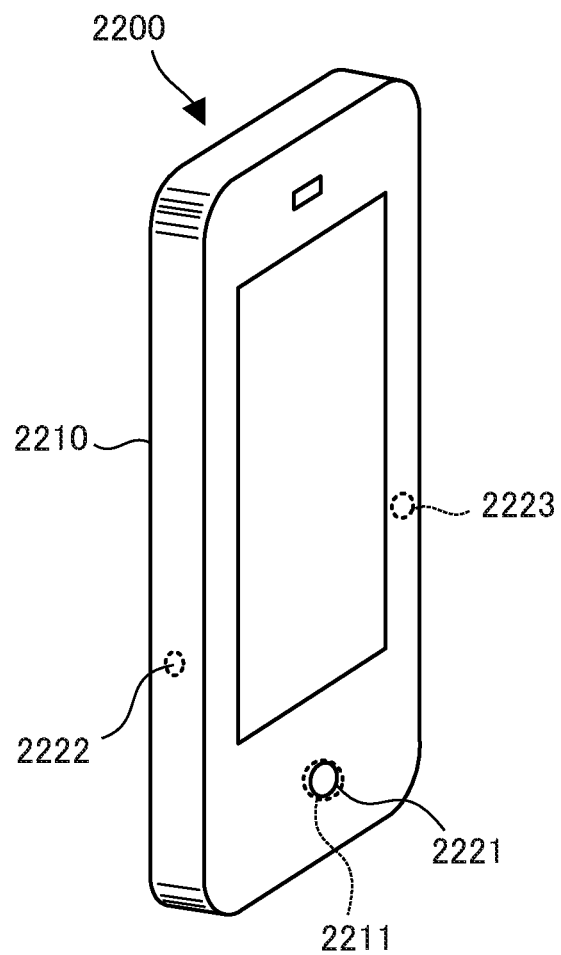
FIG. 22A is a view showing the outer appearance of a smartphone according to the 18th example embodiment of the present invention.
Figure 22B:
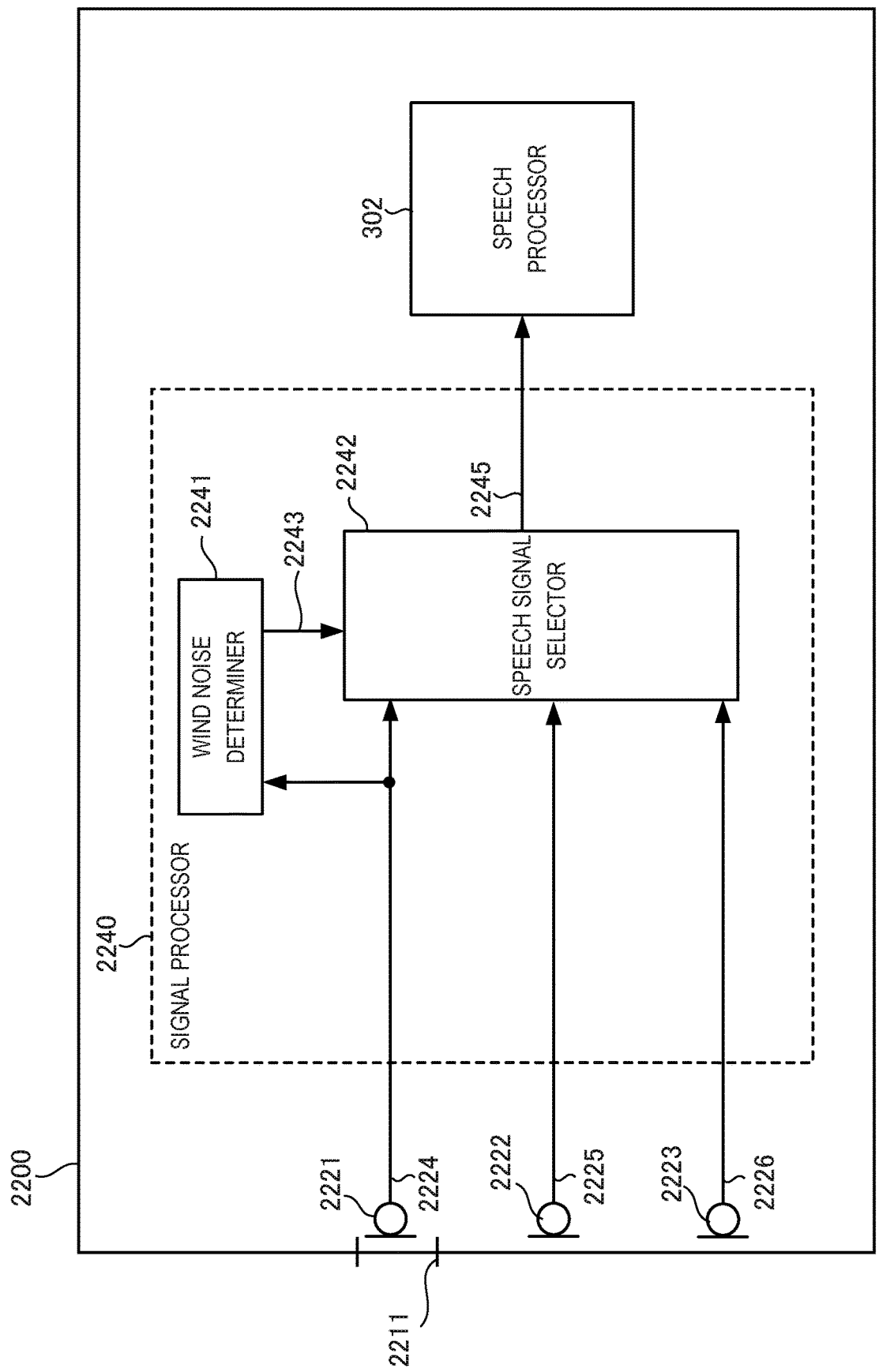
FIG. 22B is a block diagram showing the arrangement of a signal processing apparatus according to the 18th example embodiment of the present invention.

The 18th example embodiment of the present invention will be described next with reference to FIGS. 22A and 22B. FIG. 22A is a view showing the outer appearance of a smartphone 2200 to which a signal processing apparatus according to this example embodiment is applied. In FIGS. 22A and 22B, the same reference numerals as in the above-described example embodiments denote the same components and a description thereof will be omitted.

Referring to FIG. 22A, the smartphone 2200 includes a case 2210, and a main microphone 2221 is arranged close to an opening 2211 formed in the front surface of the case 2210. In addition, two sub microphones 2222 and 2223 are arranged inside the two side surfaces of the case 2210 apart from the opening 2211, respectively.

The signal processing apparatus according to this example embodiment will be described with reference to FIG. 22B. FIG. 22B shows the overall arrangement of the smartphone 2200 as one of signal processing apparatuses. As shown in FIG. 22B, the smartphone 2200 includes the main microphone 2221, the sub microphones 2222 and 2223, and a signal processor 2240.

The main microphone 2221 is a high-quality microphone that is arranged close to the opening 2211 formed in the case of the smartphone 2200, picks up a sound outside the apparatus via the opening 2211, and outputs a speech signal 2224.

The sub microphones 2222 and 2223 are arranged in the smartphone 2200, pick up a pickup target sound outside the apparatus via the case, and output speech signals 2225 and 2226, respectively.

A wind noise determiner 2241 compares the strength of the speech signal 2224 output from the main microphone 2221 with a predetermined threshold, and outputs a binary signal 2243 to a speech signal selector 2242. The threshold is set to a signal strength slightly higher than that obtained when no predetermined amount of wind noise is mixed in the speech signal 2224 output from the main microphone 2221. Thus, it can be determined based on the binary signal 2243 whether the speech signal 2224 includes the predetermined amount of wind noise.

The speech signal selector 2242 receives the output signals 2224 to 2226 from the microphones 2221 to 2223, respectively. Furthermore, if it is determined based on the binary signal 2243 that the speech signal 2224 includes no predetermined amount of wind noise, the speech signal selector 2242 outputs the speech signal 2224 to a speech processor 302 as an output signal 2245.

If it is determined based on the binary signal 2243 that the speech signal 2224 includes the predetermined amount of wind noise, the speech signal selector 2242 selects the signal having an intermediate signal amplitude from the signals 2224 to 2226, and sets the selected signal as the output signal 2245.

According to this example embodiment, even if the three microphones 2221 to 2223 are used, it is possible to obtain a speech signal with sufficiently reduced wind noise.

19th Example Embodiment

Figure 23:
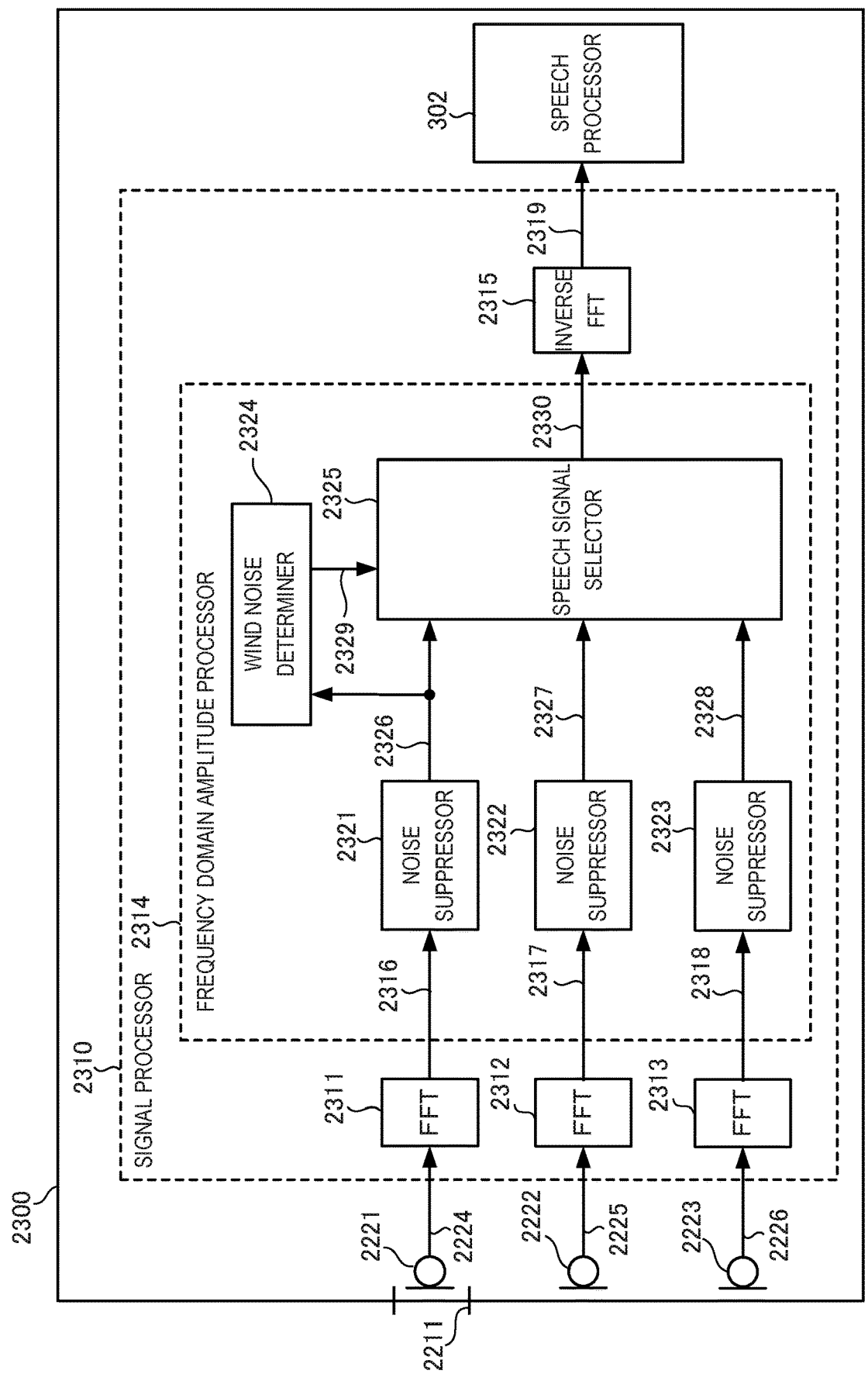
FIG. 23 is a block diagram showing the arrangement of a signal processing apparatus according to the 19th example embodiment of the present invention.

A signal processing apparatus according to the 19th example embodiment of the present invention will be described next with reference to FIG. 23. In FIG. 23, the same reference numerals as in the above-described 18th example embodiment denote the same components and a description thereof will be omitted. This example embodiment is different from the above-described 18th example embodiment in that Fourier transformers 2311 to 2313, a frequency domain amplitude processor 2314, and an inverse Fourier transformer 2315 are provided.

The Fourier transformers 2311 to 2313 receive speech signals 2224 to 2226, and output signals 2316 to 2318 obtained by Fourier-transforming the speech signals 2224 to 2226, respectively.

As described above, when the Fourier transformers 2311 to 2313 Fourier-transform the speech signals, each of the speech signals is divided into a plurality of frequency components having predetermined amplitudes.

Noise suppressors 2321 to 2323 receive the signals 2316 to 2318, generate signals 2326 to 2328 by suppressing the noise components of these signals for each frequency domain, and output the generated signals, respectively.

For each predetermined frequency domain, a wind noise determiner 2324 compares the strength of the signal 2326 with a predetermined threshold, and outputs a binary signal 2329 to a speech signal selector 2325. In this case, the threshold is set to a signal strength slightly higher than that obtained when no predetermined amount of wind noise is mixed in the speech signal 2224 output from the main microphone 2221. Thus, based on the binary signal 2329, it can be determined whether the speech signal 2224 includes the predetermined amount of wind noise.

The speech signal selector 2325 receives the output signals 2326 to 2328 from the noise suppressors 2321 to 2323, respectively. Furthermore, if it is determined based on the binary signal 2329 that the speech signal 2224 includes no predetermined amount of wind noise, the speech signal selector 2325 outputs the speech signal 2224 to a speech processor 302 as an output signal 2330.

If it is determined based on the binary signal 2329 that the speech signal 2224 includes the predetermined amount of wind noise, the speech signal selector 2325 selects a signal having an intermediate signal amplitude from the signals 2326 to 2328, and sets the selected signal as the output signal 2330.

The inverse Fourier transformer 2315 receives the signal 2330 output from the speech signal selector 2325, generates a signal 2319 by inversely Fourier-transforming the signal, and outputs the generated signal to the speech processor 302.

According to this example embodiment as well, the speech signal 2319 output from the inverse Fourier transformer 2315 is a speech signal with sufficiently reduced wind noise.

20th Example Embodiment

Figure 24:
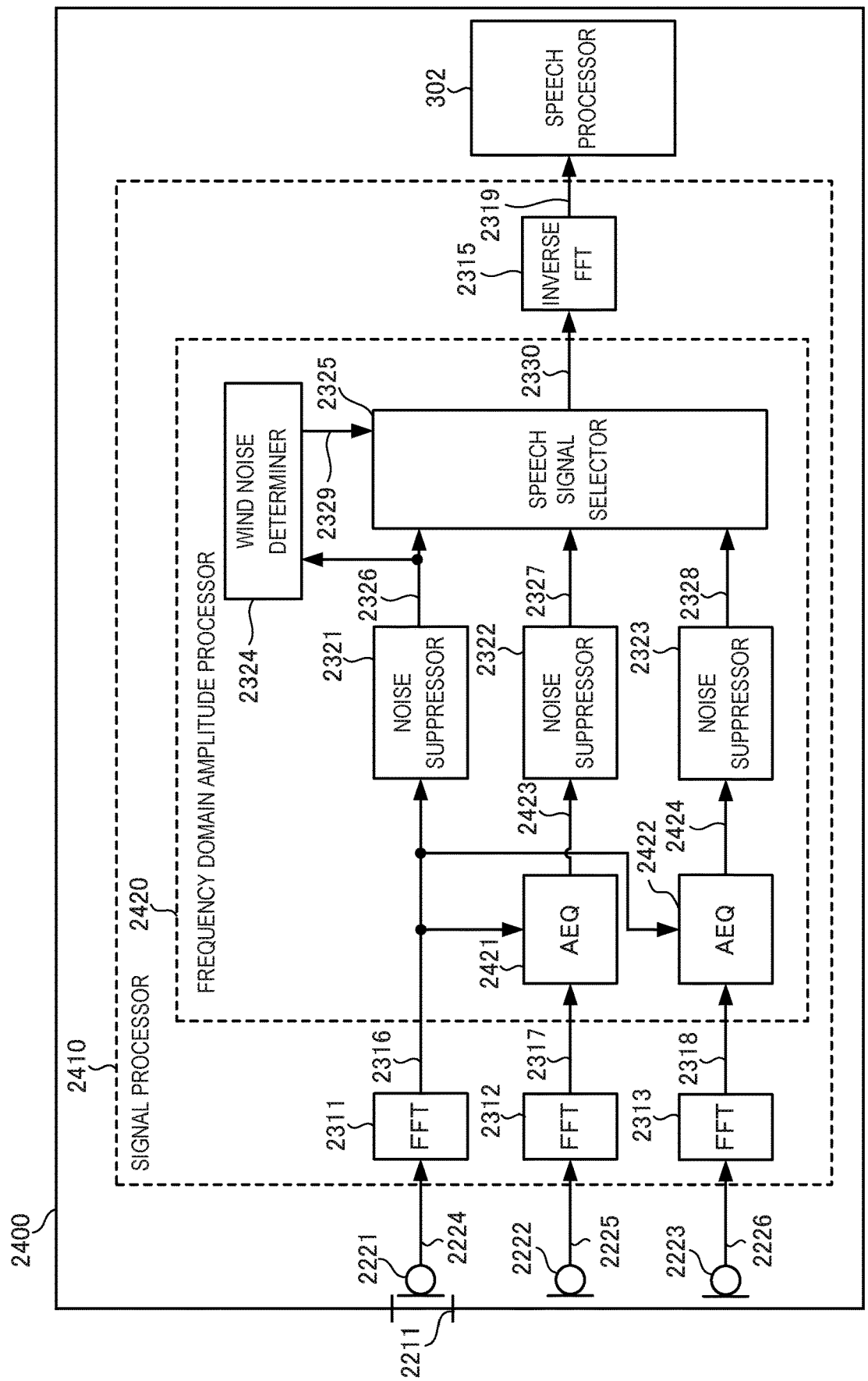
FIG. 24 is a block diagram showing the arrangement of a signal processing apparatus according to the 20th example embodiment of the present invention.

A signal processing apparatus according to the 20th example embodiment of the present invention will be described next with reference to FIG. 24. FIG. 24 shows the overall arrangement of a signal processing apparatus 2400. The signal processing apparatus 2400 according to this example embodiment is different from that according to the above-described 19th example embodiment in that two automatic equalizers are provided.

That is, a frequency domain amplitude processor 2420 includes automatic equalizers (AEQs) 2421 and 2422, noise suppressors 2321 to 2323, a wind noise determiner 2324, and a speech signal selector 2325. Components and their operations denoted by the same reference numerals as in the 19th example embodiment are the same as those in the 19th example embodiment, and a detailed description thereof will be omitted.

The automatic equalizer 2421 receives signals 2316 and 2317, and outputs, for each of a predetermined number of divided frequency domains, a signal 2423 obtained by correcting the frequency characteristic of the signal 2317 based on the signal 2316.

The automatic equalizer 2422 receives the signal 2316 and a signal 2318, and outputs, for each frequency domain, a signal 2424 obtained by correcting the frequency characteristic of the signal 2318 based on the signal 2316.

The noise suppressors 2321 to 2323 receive the signals 2316, 2423, and 2424, generate signals 2326 to 2328 by suppressing the noise components of these signals for each frequency domain, and outputs the generated signals, respectively.

The wind noise determiner 2324 compares the strength of the signal 2326 with a predetermined threshold for each predetermined frequency domain, and outputs a binary signal 2329 to the speech signal selector 2325. In this example, the threshold is set to a signal strength slightly higher than that obtained when no predetermined amount of wind noise is mixed in a speech signal 2224 output from a main microphone 2221. Thus, it can be determined based on the binary signal 2329 whether the speech signal 2224 includes the predetermined amount of wind noise.

The speech signal selector 2325 receives the output signals 2326 to 2328 from the noise suppressors 2321 to 2323, respectively. Furthermore, if it is determined based on the binary signal 2329 that the speech signal 2224 includes no predetermined amount of wind noise, the speech signal selector 2325 outputs the speech signal 2224 to an inverse Fourier transformer 2315 as an output signal 2330.

If it is determined based on the binary signal 2329 that the main speech signal 2224 includes the predetermined amount of wind noise, the speech signal selector 2325 selects the signal having an intermediate signal amplitude from the signals 2326 to 2328, and sets the selected signal as the output signal 2330.

According to this example embodiment, a speech signal 2319 supplied to a speech processor 302 is a speech signal with sufficiently reduced wind noise.

21st Example Embodiment

Figure 26:
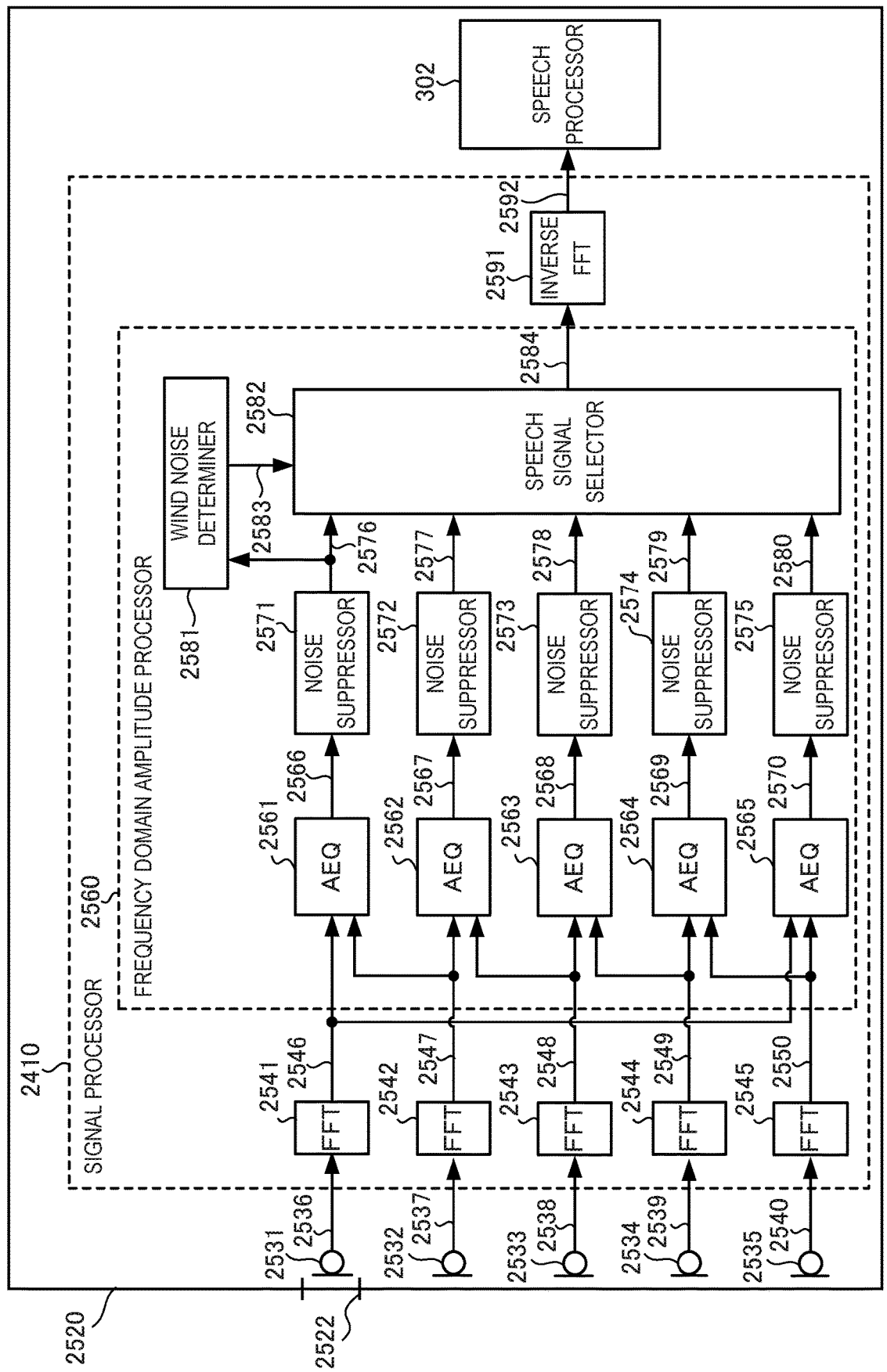
FIG. 26 is a block diagram showing the arrangement of a signal processing apparatus according to the 21st example embodiment of the present invention.

A multicopter incorporating a signal processing apparatus according to the 21st example embodiment of the present invention will be described next with reference to FIGS. 25 and 26. FIG. 25 is a view for explaining the signal processing apparatus and the outer appearance of the multicopter incorporating a communication apparatus to which the signal processing apparatus according to this example embodiment is applied. FIG. 26 is a block diagram showing the signal processing apparatus according to this example embodiment.

Referring to FIG. 25, a multicopter 2500 includes a known multicopter main body 2510 and a communication apparatus 2520 attached to the lower portion of the multicopter main body.

The communication apparatus 2520 includes a case 2521 having a cubic shape, an opening 2522 is formed in the bottom surface of the case 2521, and a main microphone 2531 is arranged close to the opening 2522. Furthermore, sub microphones 2532 to 2535 are respectively arranged inside the four side surfaces of the case 2521. With this arrangement, the main microphone 2531 picks up a sound outside the case via the opening 2522, and each of the sub microphones 2532 to 2535 picks up a sound outside the case via the case.

In addition, the communication apparatus 2520 generates speech by sufficiently reducing a predetermined amount of wind noise of the sound picked up by each of the microphones 2531 to 2535, and transmits the generated speech as a radio wave signal to the outside of the apparatus.

As shown in FIG. 26, the signal processing apparatus 2520 according to this example embodiment includes the microphones 2531 to 2535, Fourier transformers 2541 to 2545, a frequency domain amplitude processor 2560, and an inverse Fourier transformer 2591.

The Fourier transformers (FFTs) 2541 to 2545 receive speech signals 2536 to 2540, and output signals 2546 to 2550 obtained by Fourier-transforming the speech signals, respectively.

When the Fourier transformers 2541 to 2545 Fourier-transform the speech signals, each of the speech signals is divided into a plurality of frequency components having predetermined amplitudes.

An automatic equalizer 2561 receives the signals 2546 and 2547, and outputs, for each of a predetermined number of divided frequency domains, a signal 2566 obtained by correcting the frequency characteristic of the signal 2546 based on the signal 2547. Note that if it can be determined that correction is unnecessary, no correction needs to be performed or the automatic equalizer 2561 may be omitted.

An automatic equalizer 2562 receives the signals 2547 and 2548, and outputs, for each frequency domain, a signal 2567 obtained by correcting the frequency characteristic of the signal 2547 based on the signal 2548.

An automatic equalizer 2563 receives the signals 2548 and 2549, and outputs, for each frequency domain, a signal 2568 obtained by correcting the frequency characteristic of the signal 2548 based on the signal 2549.

An automatic equalizer 2564 receives the signals 2549 and 2550, and outputs, for each frequency domain, a signal 2569 obtained by correcting the frequency characteristic of the signal 2549 based on the signal 2550.

An automatic equalizer 2565 receives the signals 2546 and 2550, and outputs, for each frequency domain, a signal 2570 obtained by correcting the frequency characteristic of the signal 2550 based on the signal 2546.

Noise suppressors 2571 to 2575 receive the signals 2566 to 2570, generate signals 2576 to 2580 by suppressing the noise components of the signals for each frequency domain, and output the generated signals, respectively.

For each predetermined frequency domain, a wind noise determiner 2581 compares the strength of the signal 2576 with a predetermined threshold, and outputs a binary signal 2583 to a speech signal selector 2582. In this case, the threshold is set to a signal strength slightly higher than that obtained when no predetermined amount of wind noise is mixed in the speech signal 2536 output from the main microphone 2531. Thus, based on the binary signal 2583, it can be determined whether the speech signal 2536 includes the predetermined amount of wind noise.

The speech signal selector 2582 receives the binary signal 2583 and the output signals 2576 to 2580 respectively from the noise suppressors 2571 to 2575. Furthermore, if it is determined based on the binary signal 2583 that the speech signal 2536 includes no predetermined amount of wind noise, the speech signal selector 2582 outputs the signal 2576 to an inverse Fourier transformer 2591 as an output signal 2584.

If it is determined based on the binary signal 2583 that the speech signal 2536 includes the predetermined amount of wind noise, the speech signal selector 2582 selects a signal having an intermediate signal amplitude from the signals 2577 to 2580, and sets the selected signal as the output signal 2584.

The inverse Fourier transformer 2591 receives the output signal 2584 output from the speech signal selector 2582, generates a signal 2592 by inversely Fourier-transforming the signal, and outputs the generated signal to a speech processor 302.

According to this example embodiment, the wind noise components in the speech signals 2536 to 2540 corresponding to the respective microphones 2531 to 2535 are reduced by selecting signals whose frequency characteristics fall within a predetermined range. Furthermore, noise is suppressed while correcting the amplitude for each of the predetermined number of divided frequency domains. If the main speech signal includes the predetermined amount of wind noise, signals having intermediate signal amplitudes are selected and combined. With this processing, the speech signal 2592 output from the inverse Fourier transformer 2591 is a speech signal with sufficiently reduced wind noise.

22nd Example Embodiment

The 22nd example embodiment of the present invention will be described next with reference to FIG. 27. FIG. 27 is a view showing the outer appearance of a smartphone 2700 to which the signal processing apparatus according to each of the above-described example embodiments is applied. In FIG. 27, the same reference numerals as those in the above-described example embodiments denote the same components and a description thereof will be omitted.

Referring to FIG. 27, the smartphone 2700 includes a case 2710, and a main microphone 202 and a sub microphone 203 for speech communication are provided in the case 2710. Furthermore, two openings 2711 and 2712 are formed at a predetermined interval in the case 2710. The main microphone 202 is arranged close to the opening 2711, and the sub microphone 203 is arranged close to the opening 2712.

The opening 2712 is closed by a windshield 2713 such as rubber. Note that the direction of the opening 2712 closed by the windshield 2713 may be different from that of the opening 2711.

When picking up speech by the main microphone 202 at the time of speech communication or speech recording, the smartphone 2700 to which the signal processing apparatus according to each of the above-described example embodiments is applied, as described above, can obtain a speech signal in which no predetermined amount of wind noise is mixed. That is, if a wind blows against the opening 2711 and the predetermined amount of wind noise is mixed in a main speech signal, a sub speech signal of the sub microphone 203 in which no predetermined amount of wind noise is mixed is used. Thus, even if there is a wind, it is possible to always obtain a speech signal with sufficiently reduced wind noise.

23rd Example Embodiment

Figure 28:
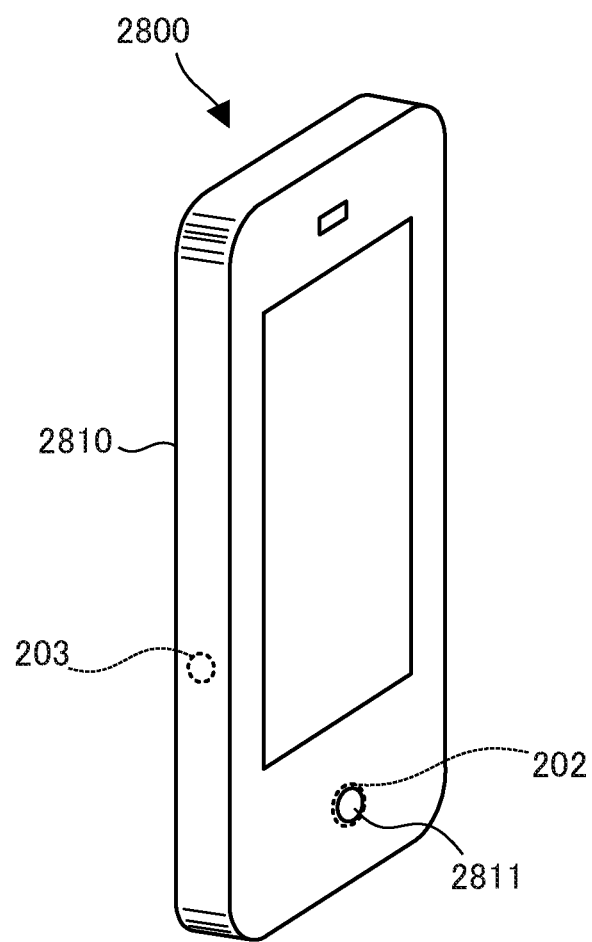
FIG. 28 is a view showing the outer appearance of a smartphone according to the 23rd example embodiment of the present invention.

The 23rd example embodiment of the present invention will be described next with reference to FIG. 28. FIG. 28 is a view showing the outer appearance of a smartphone 2800 to which the signal processing apparatus according to each of the above-described example embodiments is applied. In FIG. 28, the same reference numerals as those in the above-described example embodiments denote the same components and a description thereof will be omitted.

Referring to FIG. 28, the smartphone 2800 includes a case 2810, and a main microphone 202 and a sub microphone 203 for speech communication are provided in the case 2810. Furthermore, an opening 2811 is formed in the front surface of the case 2810. The main microphone 202 is arranged close to the opening 2811, and the sub microphone 203 is arranged inside a side surface of the case 2810 apart from the opening 2811.

If the sub microphone 203 is arranged inside the side surface of the case 2810 in this way, even if a wind blows against the front surface of the case 2810, no wind blows against the side surface of the case 2810. Therefore, if a wind blows against the opening 2811 and a predetermined amount of wind noise is mixed in a main speech signal, a sub speech signal of the sub microphone 203 in which no predetermined amount of wind noise is mixed is used. Thus, even if there is a wind, it is possible to always obtain a speech signal with sufficiently reduced wind noise.

24th Example Embodiment

Figure 29:
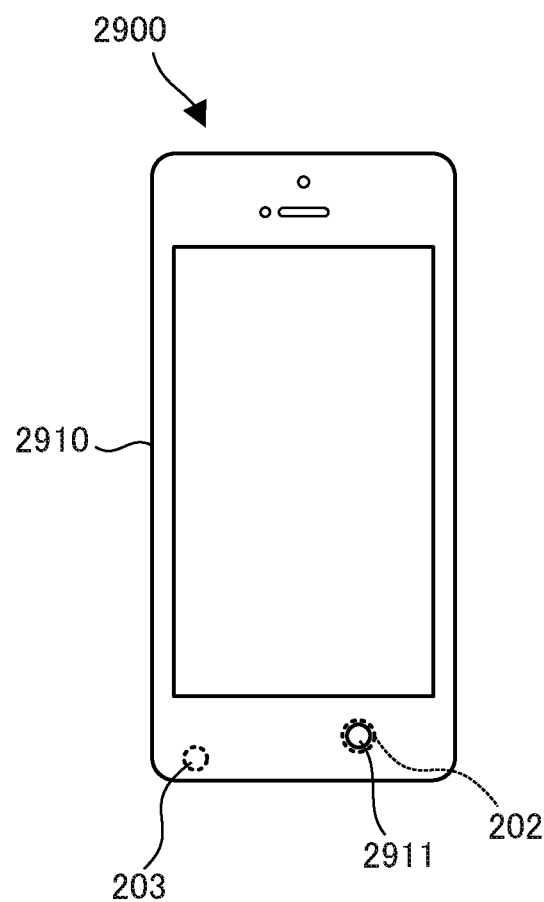
FIG. 29 is a view showing the outer appearance of a smartphone according to the 24th example embodiment of the present invention.

The 24th example embodiment of the present invention will be described next with reference to FIG. 29. FIG. 29 is a view showing the outer appearance of a smartphone 2900 to which the signal processing apparatus according to each of the above-described example embodiments is applied. In FIG. 29, the same reference numerals as those in the above-described example embodiments denote the same components and a description thereof will be omitted.

Referring to FIG. 29, the smartphone 2900 includes a case 2910, and a main microphone 202 for speech communication is arranged close to an opening 2911 formed in the front surface of the case 2910. Furthermore, the main microphone 202 picks up a sound outside the case 2910 via the opening 2911.

In addition, a sub microphone 203 formed from a bone conduction microphone is provided in the case 2910.

When picking up speech by the main microphone 202 at the time of speech communication or speech recording, the smartphone 2900 to which the signal processing apparatus according to each of the above-described example embodiments is applied, as described above, can obtain a speech signal in which no predetermined amount of wind noise is mixed.

Other Example Embodiments

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims. For example, an opening facing a microphone may be closed by a film of a predetermined thickness, thereby implementing sealing so as to pick up a sound. Those skilled in this art can readily understand that the components related to the speech signal processing according to the present invention can be implemented using only hardware, only software, or both hardware and software.

The present invention is applicable to a system including a plurality of devices or a single apparatus. The present invention is also applicable even when an information processing program for implementing the functions of example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

What is claimed is:

1. A signal processing apparatus comprising:
a main microphone that is provided so as to be readily influenced by movement of air outside the signal processing apparatus;
a sub microphone that is provided so as to be hardly influenced by movement of air outside the signal processing apparatus and provided not closer to an opening formed in the signal processing apparatus than the main microphone;
a determiner that determines, based on a strength of a main speech signal output from said main microphone, whether the main speech signal includes a predetermined amount of wind noise; and
a selector that receives the main speech signal and a sub speech signal output from said sub microphone and outputs:
the sub speech signal, if it is determined that the main speech signal includes the predetermined amount of wind noise, or
the main speech signal, if it is determined that the main speech signal includes no predetermined amount of wind noise,
wherein by comparing the strength of the main speech signal output from said main microphone with a strength of the sub speech signal output from said sub microphone, said determiner determines that the main speech signal includes the predetermined amount of wind noise when the strength of a signal obtained by multiplying the main speech signal output from said main microphone by a predetermined constant is equal to or larger than the strength of the sub speech signal output from said microphone.

2. The signal processing apparatus according to claim 1, wherein
said main microphone is provided close to the opening formed in the signal processing apparatus, and
said sub microphone is provided apart from the opening.

3. The signal processing apparatus according to claim 1, wherein
said main microphone is provided closer to a first opening formed in the signal processing apparatus than a second opening formed in the signal processing apparatus, and
said sub microphone is provided closer to the second opening than the first opening and into which a windshield member is inserted.

4. The signal processing apparatus according to claim 3, wherein a direction of the first opening is different from a direction of the second opening.

5. The signal processing apparatus according to claim 3, wherein the second opening comprises a plurality of second openings, and said sub microphone comprises a plurality of sub microphones.

6. The signal processing apparatus according to claim 1, wherein
when a determination result of said determiner changes, said selector combines the main speech signal with the sub speech signal while changing a ratio between the main speech signal and the sub speech signal for a predetermined time.

7. The signal processing apparatus according to claim 1, wherein said determiner includes a low-pass filter that passes a low frequency domain of the main speech signal, and performs determination based on an output signal of said low-pass filter.

8. The signal processing apparatus according to claim 1, further comprising:
an equalizer that changes a frequency characteristic of the sub speech signal.

9. The signal processing apparatus according to claim 1, further comprising:
a frequency transformer that applies frequency transformation processing to the main speech signal and the sub speech signal.

10. The signal processing apparatus according to claim 1, further comprising:
a noise suppressor that applies noise suppression processing to the main speech signal and the sub speech signal.

11. The signal processing apparatus according to claim 1, wherein
said sub microphone comprises a plurality of sub microphones.

12. A signal processing method of a signal processing apparatus including a main microphone that is provided so as to be readily influenced by movement of air outside the signal processing apparatus and a sub microphone that is provided so as to be hardly influenced by movement of air outside the signal processing apparatus and provided not closer to an opening formed in the signal processing apparatus than the main microphone, the method comprising:
determining, based on a strength of a main speech signal output from the main microphone, whether the main speech signal includes a predetermined amount of wind noise; and
receiving the main speech signal and a sub speech signal output from the sub microphone, outputting:
the sub speech signal, if it is determined that the main speech signal includes the predetermined amount of wind noise; or
the main speech signal, if it is determined that the main speech signal includes no predetermined amount of wind noise,
wherein by comparing the strength of the main speech signal output from said main microphone with a strength of the sub speech signal output from said sub microphone, determining that the main speech signal includes the predetermined amount of wind noise based on the strength of a signal obtained by multiplying the main speech signal output from said main microphone by a predetermined constant is equal to or larger than the strength of the sub speech siganl output from said sub microphone.

13. A non-transitory computer readable medium storing a signal processing program of a signal processing apparatus including a main microphone that is provided so as to be readily influenced by movement of air outside the signal processing apparatus and a sub microphone that is provided so as to be hardly influenced by movement of air outside the signal processing apparatus and provided not closer to an opening formed in the signal processing apparatus than the main microphone, the program for causing a computer apparatus to execute a method, comprising:
determining, based on a strength of a main speech signal output from the main microphone, whether the main speech signal includes a predetermined amount of wind noise;
receiving the main speech signal and a sub speech signal output from the sub microphone, outputting:
the sub speech signal, if it is determined that the main speech signal includes the predetermined amount of wind noise, or
the main speech signal , if it is determined that the main speech signal includes no predetermined amount of wind noise, selection processing for outputting the main speech signal,
wherein by comparing strength of the main speech signal output from said main microphone with a strength of the sub speech signal output from said sub microphone, determining that the main speech signal includes the predetermined amount of wind noise based on the strength of a signal obtained by multiplying the main speech signal output from said main microphone by a predetermined constant is equal to or larger than the strength of the sub speech signal output from said sub microphone.

* * * * *

UNITED STATES PATENT AND TRADEMARK OFFICE
CERTIFICATE OF CORRECTION

| | | |
|---|---|---|
| PATENT NO. | : 11,043,228 B2 | Page 1 of 1 |
| APPLICATION NO. | : 15/571914 | |
| DATED | : June 22, 2021 | |
| INVENTOR(S) | : Osamu Hoshuyama et al. | |

It is certified that error appears in the above-identified patent and that said Letters Patent is hereby corrected as shown below:

On the Title Page

Delete "(73) Assignees: NEC CORPORATION, Tokyo(JP)"
Insert --"(73) Assignee: NEC CORPORATION, Tokyo(JP); NEC PLATFORMS, LTD., Kanagawa (JP)--

Signed and Sealed this
Sixth Day of June, 2023

Katherine Kelly Vidal
*Director of the United States Patent and Trademark Office*